US 8,584,098 B2

(12) United States Patent
Schmelter et al.

(10) Patent No.: US 8,584,098 B2
(45) Date of Patent: Nov. 12, 2013

(54) COMPONENT STATISTICS FOR APPLICATION PROFILING

(75) Inventors: Ralf Schmelter, Wiesloch (DE); Michael Wintergerst, Muhlhausen (DE); Dietrich Mostowoj, Ludwigshafen (DE)

(73) Assignee: SAP AG, Walldorf (DE)

(*) Notice: Subject to any disclaimer, the term of this patent is extended or adjusted under 35 U.S.C. 154(b) by 564 days.

(21) Appl. No.: 12/631,701

(22) Filed: Dec. 4, 2009

(65) Prior Publication Data
US 2011/0138365 A1 Jun. 9, 2011

(51) Int. Cl.
G06F 9/44 (2006.01)
G06F 9/45 (2006.01)

(52) U.S. Cl.
USPC .......................................... 717/130; 717/158

(58) Field of Classification Search
None
See application file for complete search history.

(56) References Cited

U.S. PATENT DOCUMENTS

| 6,732,357 | B1  | 5/2004  | Berry et al.      |         |
|-----------|-----|---------|-------------------|---------|
| 6,857,120 | B1  | 2/2005  | Arnold et al.     |         |
| 6,954,923 | B1  | 10/2005 | Yates et al.      |         |
| 7,058,927 | B2  | 6/2006  | Yenne et al.      |         |
| 7,120,901 | B2  | 10/2006 | Ferri et al.      |         |
| 7,266,810 | B2  | 9/2007  | Karkare et al.    |         |
| 7,568,185 | B1  | 7/2009  | Shapiro et al.    |         |
| 7,577,875 | B2* | 8/2009  | Nelson et al.     | 714/38.14 |
| 7,614,043 | B2* | 11/2009 | Ognev et al.      | 717/126 |
| 7,712,082 | B2* | 5/2010  | Broman et al.     | 717/127 |
| 7,962,924 | B2  | 6/2011  | Kuiper et al.     |         |
| 8,108,839 | B2* | 1/2012  | Clark             | 717/128 |
| 8,117,599 | B2  | 2/2012  | Edmark et al.     |         |
| 8,141,044 | B2  | 3/2012  | Mann et al.       |         |
| 8,141,053 | B2  | 3/2012  | Levine            |         |
| 8,239,167 | B2* | 8/2012  | Ramacher et al.   | 702/184 |
| 8,291,381 | B2* | 10/2012 | Lai et al.        | 717/124 |
| 8,429,467 | B2* | 4/2013  | Fallen et al.     | 714/57  |
| 2002/0174416 | A1 | 11/2002 | Bates et al.    |         |
| 2003/0225769 | A1 | 12/2003 | Chkodrov et al. |         |
| 2004/0078784 | A1 | 4/2004  | Bates et al.    |         |
| 2004/0093589 | A1 | 5/2004  | Master          |         |
| 2005/0071821 | A1* | 3/2005 | Levine et al.   | 717/130 |
| 2005/0155021 | A1* | 7/2005 | DeWitt et al.   | 717/130 |
| 2005/0216793 | A1 | 9/2005  | Entin et al.    |         |

(Continued)

FOREIGN PATENT DOCUMENTS

WO WO2005002258 A1 1/2005

OTHER PUBLICATIONS

"Debugging Reinvented: Asking and Answering Why and Why Not Questions about Program Behavior", Ko et al. May 10-18, 2008, ACM.*

(Continued)

Primary Examiner — Don Wong
Assistant Examiner — Daxin Wu
(74) Attorney, Agent, or Firm — Fish & Richardson P.C.

(57) ABSTRACT

Implementations of the present disclosure provide methods including executing an application using one or more processors, generating a plurality of method call stacks, each method call stack comprising a plurality of methods invoked by the application, providing a component call stack based on a method call stack of the plurality of method call stacks, the component call stack comprising a plurality of components, each component being defined by one or more methods of the plurality of methods, and generating component statistics based on the component call stack and profiling data collected during the executing.

21 Claims, 14 Drawing Sheets

(56) References Cited

U.S. PATENT DOCUMENTS

| | | | |
|---|---|---|---|
| 2006/0075386 A1* | 4/2006 | Loh et al. | 717/124 |
| 2006/0206885 A1* | 9/2006 | Seidman et al. | 717/148 |
| 2006/0218543 A1* | 9/2006 | Boger | 717/157 |
| 2007/0006168 A1 | 1/2007 | Dimpsey et al. | |
| 2008/0148242 A1 | 6/2008 | Cobb et al. | |
| 2008/0209402 A1 | 8/2008 | Parkinson | |
| 2008/0243968 A1 | 10/2008 | Schmelter et al. | |
| 2008/0243969 A1 | 10/2008 | Wintergerst et al. | |
| 2008/0243970 A1 | 10/2008 | Schmelter et al. | |
| 2008/0244529 A1 | 10/2008 | Hind et al. | |
| 2008/0244531 A1 | 10/2008 | Schmelter et al. | |
| 2008/0244537 A1 | 10/2008 | Wintergerst et al. | |
| 2008/0244546 A1 | 10/2008 | Schmelter et al. | |
| 2008/0244547 A1 | 10/2008 | Wintergerst et al. | |
| 2008/0263366 A1* | 10/2008 | G | 713/190 |
| 2008/0301650 A1 | 12/2008 | Talluri et al. | |
| 2009/0144713 A1* | 6/2009 | Russell et al. | 717/158 |
| 2010/0017583 A1* | 1/2010 | Kuiper et al. | 712/227 |
| 2010/0017789 A1* | 1/2010 | Dewitt et al. | 717/126 |
| 2010/0138811 A1 | 6/2010 | Jayaraman et al. | |
| 2010/0235815 A1* | 9/2010 | Maybee et al. | 717/125 |
| 2010/0287352 A1* | 11/2010 | Chapman et al. | 711/170 |
| 2011/0138363 A1 | 6/2011 | Schmelter et al. | |
| 2011/0138366 A1 | 6/2011 | Wintergerst et al. | |
| 2011/0138385 A1 | 6/2011 | Schmelter et al. | |

OTHER PUBLICATIONS

"Chip Multiprocessor Design Space Exploration through Statistical Simulation", Genbrugge et al., published online, May 21, 2009.*

"Call-Stack Coverage for GUI Test Suite Reduction", McMaster et al., IEEE Transactions on Software Engineering, vol. 34, No. 1, Jan./Feb. 2008.*

"Method Profiling in Heavy Loaded Production J2EE Environment", IBM, Original Publication Date: Aug. 23, 2006.* dynaTrace software, Continuous Application Performance Management Across the Entire Software Lifecycle, May 26, 2010, http://www.dynatrace.com/en/application-performance-management-product.aspx, 2 pages.

Eclipse Test & Performance Tools Platform Project, May 26, 2010, http://www.eclipse.org/tptp/ 2 pages.

Java Profiler—.NET Profiler—The profilers for Java and .NET professionals, The Industry Leader in .NET & Java Profiling, May 26, 2010, http://yourkit.com/, 2 pages Gueheneuc et al., "No Java Without Caffeine—A Tool for Dynamic Analysis of Java Programs," Proceedings of the 17th IEEE International Conference on Automated Software Engineering (ASE'02), May 16, 2002, 16 pages.

"Analyzing the Performance of WebLogic-based Applications with Sitraka Jprobe", Jun. 2002, A Sitraka Technical Paper; http://www.quest.com/jprobe/pdfs/jprobe_wls_practices.pdf, 21 pages.

* cited by examiner

| Method 902 | Self Bytes | Total Bytes | |
|---|---|---|---|
| java.lang.AbstractStringBuilder.expandCapacity(int)void | 12 MB | 12 MB | |
| java.lang.String.<init>(char[],int,int)void | 11 MB | 11 MB | |
| java.lang.AbstractStringBuilder.<init>(int)void | 7 MB | 7 MB | |
| java.lang.String.substring(int,int)java.lang.String | 6 MB | 6 MB | |
| java.util.HashMap.<init>()void | 5 MB | 5 MB | |
| java.lang.Object.clone()java.lang.Object | 5 MB | 5 MB | |
| com.sap.engine.services.deploy.ApplicationInformation.getDependants()... | 5 MB | 12 MB | |
| java.lang.HashMap.addEntry(int,java.lang.Object,java.lang.Object,int)void | 4 MB | 6 MB | |
| java.util.AbstractList.iterator()java.util.Iterator | 3 MB | 3 MB | |
| java.lang.StringBuilder.toString()java.lang.String | 2 MB | 8 MB | |
| java.util.ArrayList.<init>(int)void | 2 MB | 2 MB | |
| com.sap.engine.services.deploy.ReferenceObject.<init>()void | 2 MB | 2 MB | |
| com.sap.rpe.jco.JCO$Record.decodeBYTE(int,byte[]) | 1 MB | 1 MB | |
| java.util.HashMap.resize(int)void | 1 MB | 1 MB | |
| com.sap.tc.esf.rpe.esp.SAXEventHandler$CompoundValue.<init>(com.sa... | 1 MB | 7 MB | |
| com.sap.tc.esf.rpe.esp.SAXEventHandler$Table.createNestedStructure(r... | 1 MB | 8 MB | |
| java.lang.Integer.toString(int)java.lang.String | 1 MB | 1 MB | |
| com.sap.tc.esf.rpe.esp.SAXEventHandler$SimpleValue.<init>(com.sap.tc... | 1 MB | 5 MB | |
| java.lang.ClassLoader.findLoadedClass0(java.lang.String)java.lang.Class | 1 MB | 1 MB | |
| java.lang.Throwable.fillInStackTrace()java.lang.Throwable | 1 MB | 1 MB | |
| java.nio.HeapByteBuffer.<init>(int,int)void | 1 MB | 1 MB | |
| java.util.Vector.<init>(int,int)void | 1 MB | 1 MB | |
| com.sap.tc.esf.sdo.core.EdoTable.getRow(int,com.sap.tc.esf.sdo.api.IE... | 1 MB | 2 MB | |
| java.util.HashMap.<init>(int,float)void | 1 MB | 1 MB | |

| Filter | Self Bytes | | Total Bytes |
|---|---|---|---|
| ◇ Core Services | 7,588 kB | | 135,986 kB |
| ◇ Connectivity | 22,451 kB | | 130,270 kB |
| ◇ Web Dynpro | 71,725 kB | | 116,181 kB |
| ◇ Portal | 30,278 kB | | 114,857 kB |
| ◇ Security | 2,745 kB | | 2,791 kB |
| ◇ Persistence | 1,842 kB | | 2,046 kB |
| ◇ <none> | 205 kB | | 205 kB |

FIG. 12

| Filter | Self Bytes | | Total Bytes |
|---|---|---|---|
| ⊟ ◇ Core Services | 5,139 kB | | 135,985 kB |
| ⊞ ◇ Connectivity | 683 kB | | 130,062 kB |
| ◇ Web Dynpro | 223 kB | | 115,894 kB |
| ◇ Portal | 270 kB | | 12,890 kB |
| 2 other ▸ | 232 kB | | 594 kB |
| ◇ Persistence | 675 kB | | 783 kB |
| 3 other ▸ | 522 kB | | 644 kB |
| ⊞ ◇ Connectivity | 46 kB | | 120 kB |
| ◇ Core Services | 0 kB | | 0 kB |
| ◇ <none> | 205 kB | | 205 kB |
| ◇ Connectivity | 1 kB | | 1 kB |

COMPONENT STATISTICS FOR APPLICATION PROFILING

BACKGROUND

Software applications running in a distributed application server environment may have a plurality of concurrent users accessing the servers and applications. This can result in performance and scalability problems with the servers and applications running on the servers. Performance monitoring, profiling and debugging tools can monitor software applications running on the servers to determine resource consumption information.

Software profiling is a technique for measuring where software application programs consume resources (e.g., central processing unit (CPU) computation times, memory accesses). A profiling tool or profiler can analyze the resource consumption of an application running on a server and provide profiling data based thereon. For example, a Java profiler can support a broad set of Java virtual machines (JVMs). The Java profiler can provide comprehensive profiling of a Java application running on the JVM.

SUMMARY

Implementations of the present disclosure provide computer-implemented methods for providing profiling data at a component level. In some implementations, a method includes executing an application using one or more processors, generating a plurality of method call stacks, each method call stack comprising a plurality of methods invoked by the application, providing a component call stack based on a method call stack of the plurality of method call stacks, the component call stack comprising a plurality of components, each component being defined by one or more methods of the plurality of methods, and generating component statistics based on the component call stack and profiling data collected during the executing.

In some implementations, generating component statistics includes providing profiling data corresponding to each method of the plurality of methods, and for each component, aggregating profiling data of the one or more methods that defines a particular component, a component statistic for a particular component comprising the aggregate profiling data of the one or more methods that define the particular component.

In some implementations, the method further includes defining an entry method for each component of the plurality of components to provide a plurality of defined entry methods, and grouping one or more methods based on the entry methods to provide one or more method groups, each method group corresponding to a component. Grouping can include identifying a first method as an entry method, identifying a second method as an entry method, and grouping the first method and subsequent consecutive methods into a group, the subsequent consecutive methods being prior to the second method in the method call stack. In some implementations, the first method and subsequent consecutive methods are grouped until another entry method is encountered in the consecutive methods.

In some implementations, the method further includes defining the plurality of methods invoked by the application as methods to be traced, monitoring the plurality of methods during execution of the application, and collecting the profiling data, the profiling data corresponding to each method of the plurality of methods.

In some implementations, the method further includes receiving user input identifying one or more components of interest, and identifying one or more components to be included in the plurality of components of the component call stack based on the user input.

In some implementations, the method further includes sending the component statistics for display on a client device.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes a computing device including one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is to say that methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIG. 9 is a screen-shot illustrating an alternative exemplar method statistic view included in a profiler perspective.

FIG. 11 is a screen-shot illustrating an exemplar flat component statistic view.

FIG. 12 is a screen-shot illustrating an exemplar hierarchical component statistic view.

Like reference symbols in the various drawings indicate like elements.

DETAILED DESCRIPTION

Implementations of the present disclosure are generally directed to component statistics that provide a broader view of profiling data for a profiled application. More specifically, implementations of the present disclosure relate to aggregating profiling results in component views. In some implementations, navigation or selections within the component statistics is described in a meaningful way so that further selections may be calculated based on prior selection results without requiring a new calculation based on the original profiling data. The component statistics enable a profiler to present a coarser overview of the profiling data. In this manner, complex application execution scenarios and their resultant effect on resource consumption can be clearly presented.

Figure 1:
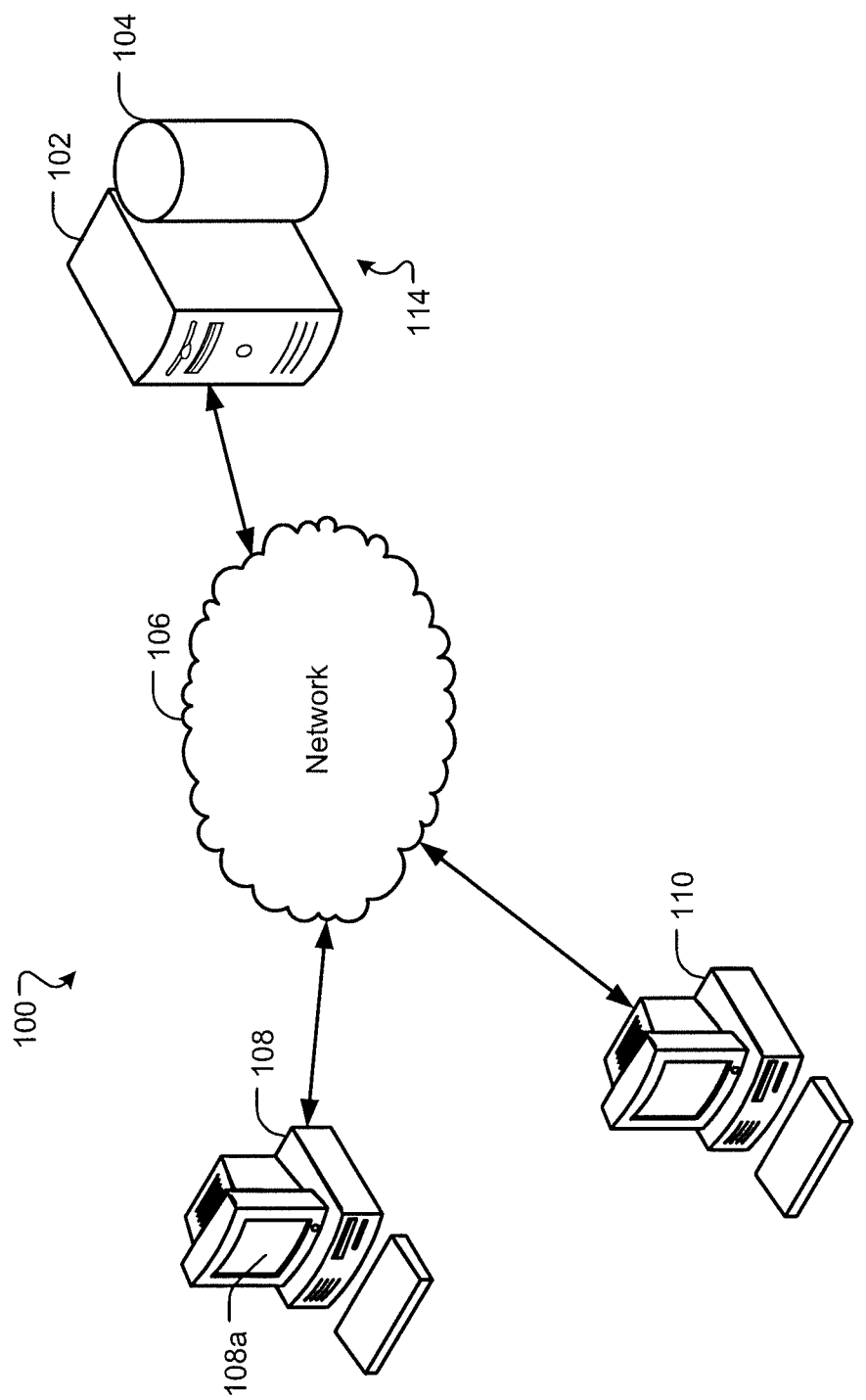
FIG. 1 is a diagram of an exemplar network architecture that can be used in accordance with implementations of the present disclosure.

Referring now to FIG. 1, a schematic illustration of an exemplar system 100 in accordance with implementations of the present disclosure can include a plurality of clients 108, 110, and a computer system 114. The computer system 114 can include a server 102 and a database 104. In some implementations, the system 100 may represent a client/server system supporting multiple computer systems (e.g., computer system 114) including one or more clients (e.g., clients 108, 110) and/or one or more servers (e.g., server 102) that are connectively coupled for communication with one another over a network 106. In some implementations, the clients (e.g., clients 108, 110) may be directly connected to the one or more servers (e.g., server 102) (without connecting by way of network 106).

The clients 108, 110 can represent various forms of processing devices including, but not limited to, a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any two or more of these data processing devices or other data processing devices. Each client 108, 110 may access application software on the server 102.

The server 102 can represent various forms of servers including, but not limited to a web server, an application server, a proxy server, a network server, or a server farm. For example, the server 102 can be an application server that executes software accessed by clients 108, 110. In operation, multiple clients (e.g., clients 108, 110) can communicate with the server 102 by way of network 106. In some implementations, a user can invoke applications available on the server 102 in a web browser running on a client (e.g., clients 108, 110). Each application can individually access data from one or more repository resources (e.g., database 104). For example, the server 102 can access database 104.

In some implementations, the client devices 108, 110 may communicate wirelessly through a communication interface (not shown), which may include digital signal processing circuitry where necessary. The communication interface may provide for communications under various modes or protocols, such as GSM voice calls, SMS, EMS, or MMS messaging, CDMA, TDMA, PDC, WCDMA, CDMA2000, or GPRS, among others. For example, the communication may occur through a radio-frequency transceiver (not shown). In addition, short-range communication may occur, such as using a Bluetooth, WiFi, or other such transceiver.

In some implementations, the system 100 can be a distributed client/server system that spans one or more networks such as network 106. The network 106 can be a large computer network, such as a local area network (LAN), wide area network (WAN), the Internet, a cellular network, or a combination thereof connecting any number of mobile clients, fixed clients, and servers. In some implementations, each client (e.g., clients 108, 110) can communicate with the server 102 via a virtual private network (VPN), Secure Shell (SSH) tunnel, or other secure network connection. In some implementations, the network 106 can include the Internet, a wireless service network and may include the Public Switched Telephone Network (PSTN). In other implementations, the network 106 may include a corporate network (e.g., an intranet) and one or more wireless access points.

Each client (e.g., clients 108, 110) can establish its own session with the server 102. Each session can be semi-permanent as it can be established at one point in time and torn down at another. Each session can involve two-way information exchange between the computer system 114 and each individual client 108, 110. For example, a Hypertext Transfer Protocol (HTTP) session enables the association of information with individual users. A session can be stateful where at least one of the communicating parts (e.g., the server 102 or the client (e.g., clients 108, 110)) can save information about the session history in order to be able to communicate. Alternatively, stateless communication includes independent requests with associated responses.

Multiple clients (e.g., clients 108, 110) can communicate via network 106 with the server 102. In order to run an application each client (e.g., clients 108, 110) can establish a corresponding session with the application server 102. In some implementations, a user can initiate a profiling session for an application running on the server 102 using the client 108. The client 108 can establish the profiling session with the server 102. The profiling session can profile an application running on a Java virtual machine (JVM) on the server 102. For example, a profiler, included on the server 102, can record and store profiling data for a profiling session in the database 104 for analysis by the user running the profiling session from the client 108. In some implementations, the profiling data can be stored in a file system on the server 102. The profiler can also send the profiling data to the client 108 for analysis by the user. The client 108 can display the profiling data recorded for the application running on the JVM in a graphical user interface (GUI) displayed on display device 108a on the client 108.

As used herein, the term profiling data generally refers to map data and event data. Map data can include a mapping between numeric identifiers and VM structure entities such as stack traces, thread names, classes, methods, and class loaders, for example. Event data directly relates to profiled actions occurring in a VM. Exemplar actions can include the start of threads, object allocations (e.g., for the allocation trace), method enter events, method exit events, and the actual method parameters (e.g., for the method parameter trace), sampled thread stack traces (e.g., for the performance trace), and/or garbage collection events. The map data can be referenced in the event data. Consequently, instead of writing explicit class specifications, method specifications, and complete stack traces within the event data, only the corresponding numeric identifier need be written. In this manner, the amount of event information (from a memory perspective) can be drastically reduced.

Figure 2:
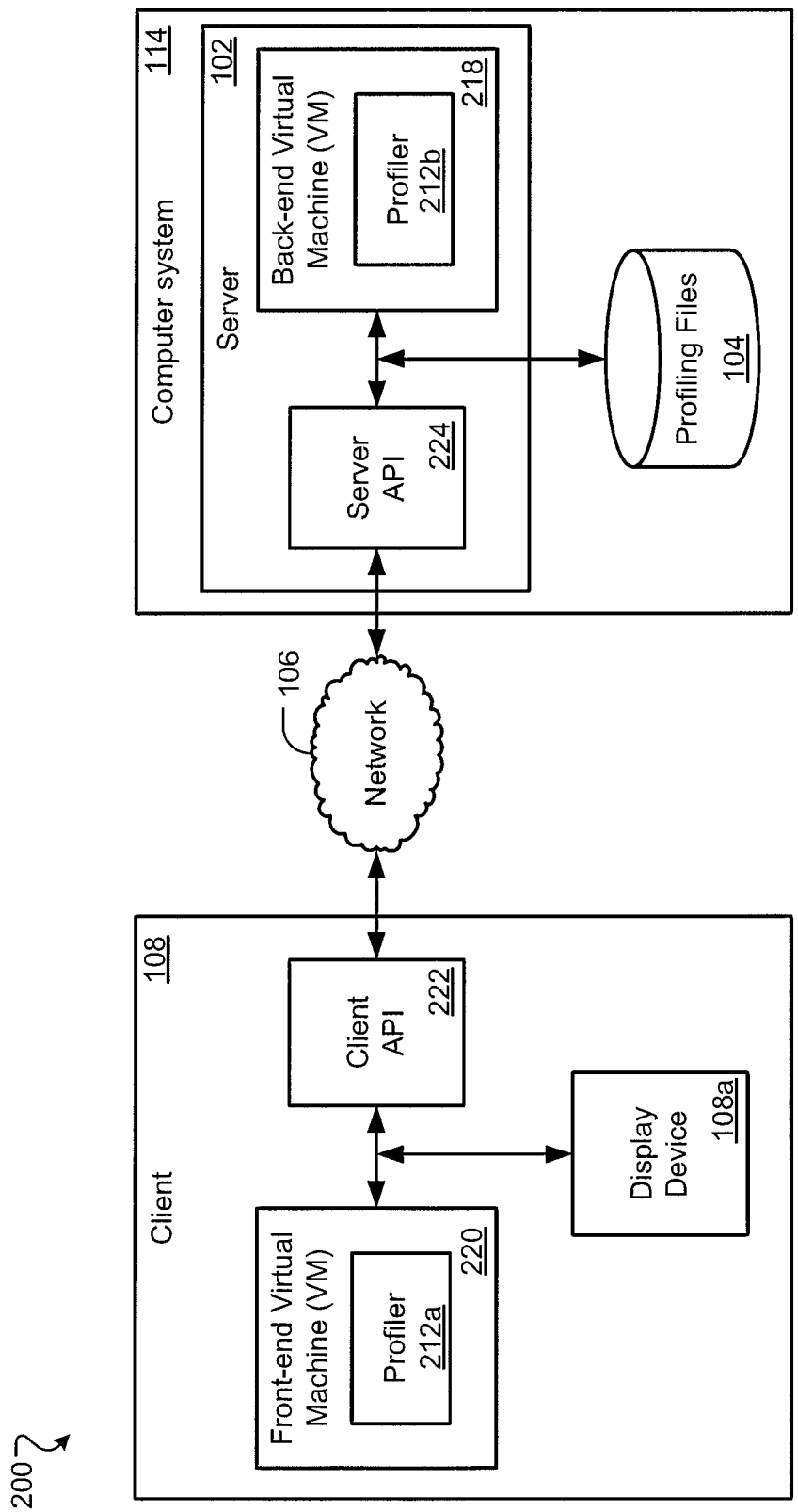
FIG. 2 is a block diagram of an exemplar system that includes a profiler.

FIG. 2 is a block diagram of an exemplar system 200 that includes a profiler. The system 200 is implemented as a client/server system, an example of which can include system 100 of FIG. 1. The exemplar system 200 can be implemented using client 108, network 106 and computer system 114 that includes server 102 and database 104.

For example, the profiler can analyze the resource consumption of an application running on a JVM. In some implementations, the application can be a standalone Java application. In some implementations, the application can be a complex enterprise application that can utilize a plurality of resources. For example, the profiler can be the JVM Profiler provided by SAP AG.

The profiler can include two components: a profiler front-end component (front-end profiler 212a) and a profiler back-end component (back-end profiler 212b). The back-end profiler 212b can be integrated into a back-end virtual machine (VM) 218. In some implementations, a native application can be provided as a front-end, the native application understanding the profiling protocol of the back-end. In some implementations, the front-end profiler 212a can be integrated into a front-end VM 220. For example, the back-end VM and the front-end VM can each be a JVM provided by SAP AG. The JVM can run one or more applications integrated with the back-end profiler 212b in the back-end VM 218 and provides for connection to the front-end profiler 212a. The back-end profiler 212b can provide profiling data for one or more applications running on the back-end VM 218. The front-end profiler 212a can provide a visual representation of the profiling data provided by the back-end profiler 212b (e.g., client 108 can include front-end profiler 212a and display device 108a can display the profiling data to a user in a GUI).

For example, a back-end profiler for a JVM can expose profiling data from a Java application executing on a back-end VM. The back-end profiler can use a Java Virtual Machine Tool Interface (JVMTI) to collect profiling data from the JVM. In some implementations, the JVM can provide an interface to load the back-end profiler (e.g., as an agent) into the JVM process. In some scenarios, a proprietary implementation can directly integrate the back-end profiler into the JVM. For example, the SAP® JVM can include a proprietary back-end profiler directly integrated into the back-end VM.

In some implementations, during a profiling session, a user can directly connect to the VM that includes the profiler (e.g., back-end VM 218 that includes back-end profiler 212b). The user can interactively request profiling data be sent from the back-end profiler 212b to the front-end profiler 212a. Profilers 212a, 212b can communicate with each other using client application programming interface (API) 222 and server API 224, respectively. For example, computer system 114 can establish a socket connection between the back-end profiler 212b and front-end profiler 212a. The profilers 212a, 212b can be located on physically different machines (e.g., client 108 and server 102, respectively). The profiling data can be transferred from the back-end profiler 212b to the front-end profiler 212a (e.g., by way of a socket connection or the transfer of one or more files). The front-end profiler 212a can receive the profiling data and prepare it for analysis and display to a user. For example, the front-end profiler 212a can display the profiling data in a GUI on display device 108a. In some implementations, the profiling data can be transferred using a file transfer.

In some implementations, the computer system 114 may directly connect to client 108 without the use of network 106. In some implementations, the front-end VM 220 and back-end VM 218 including profiler 212a and profiler 212b, respectively, may run on the same machine where client 108, server 102 and database 104 are included on the same physical machine.

The front-end profiler 212a can be a stand alone application that can communicate with the back-end profiler 212b included in the back-end VM 218 without the need for a front-end VM. More specifically, a front-end profiler may be a stand-alone program or application that is compatible with a back-end profiler. In some implementations, the front-end VM 220 can run the front-end profiler stand-alone application. The front-end profiler stand-alone application can analyze additional stand-alone applications running on the front-end VM 220. The front-end profiler stand-alone application can also analyze applications running on the back-end VM 218.

In some implementations, the profilers 212a, 212b can be integral parts of VMs 220, 218, respectively. This can allow for "on-demand" examination of applications running on the back-end VM 218. Because the VMs 220, 218 include profilers 212a, 212b, respectively, profiling can occur during runtime without the need to restart the VMs 220, 218. Including a profiler in a VM reduces the memory usage typically required, thereby minimizing the memory overhead of the computer system (e.g., computer system 114).

The server API 224 can start and stop the VM included in the back-end VM 218 that includes the application for profiling. The back-end profiler 212b can record the profiling data for the application running on the back-end VM 218. In some implementations, the back-end profiler 212b can store the profiling data as one or more profiling files in the database 104. In some implementations, the back-end profiler 212b can send the profiling data to the front-end profiler 212a for further processing. For example, an SAP® JVM's debug connection can connect the client 108 to the server 102 to communicate profiling data from the back-end profiler 212b to the front-end profiler 212a using server API 224 and client API 222, respectively.

In some implementations, a developer can use a multi-language software development environment to implement, test and debug a software project. The software development environment can be an open architecture software development platform that includes an integrated development environment (IDE) and a plug-in system. The plug-in system can allow extensions to the IDE with the ability to integrate custom tools. The plug-in system can provide a framework for integrating user-made applications and infrastructure components. For example, a front-end profiler that includes a user interface can be provided as a plug-in to the software development platform. For example, the front-end profiler can be an Eclipse plug-in that can be integrated into an Eclipse platform. The Eclipse platform can provide an IDE for implementing, testing and debugging Java based software development projects. An Eclipse platform that includes a front-end profiler plug-in can additionally provide profiling of Java based software development projects. For example, the front-end profiler 212a can be a plug-in to a software development platform running on the front-end VM 220.

A remote profiling session can occur when a host or server (e.g., server 102) that includes the application for profiling is remotely located from the client (e.g., client 108) running the application that initiates the profiling session. For example, system 200 shows an exemplar remote profiling session where the back-end VM 218 is running an application that includes the back-end profiler 212b and the client 108 initiates the profiling session from the front-end VM 220, which includes front-end profiler 212a. In a remote profiling session, opening a debugging port to the back-end VM 218 can switch the back-end VM 218 into a profiling mode. Using client 108, a user can connect to the back-end VM 218 for profiling by connecting to the debugging port. As shown in FIG. 2, the back-end profiler 212*b* is an integral part of the back-end VM 218. As described above, this can allow the back-end VM 218 to be switched into a profiling mode "on demand" during execution of the back-end VM application without the need to restart the back-end VM application.

In some implementations, a local profiling session can occur when the application for profiling and the application that initiates the profiling session are located on the same host or server (e.g., the same physical machine). The local profiling session can perform simultaneous source code implementation, testing, debugging and profiling. The host can include a local display device that displays a GUI to a user. The GUI can allow the user the ability to control and configure the profiling session.

In some implementations, a user can perform a remote or local profiling session in an online or interactive mode. In an online profiling session, a front-end profiler (e.g., front-end profiler 212*a*) can initiate a profiling session with a back-end profiler (e.g., back-end profiler 212*b*). For example, a user interacting with a GUI displayed on display device 108*a* can start and stop the profiling session as well as interact with the back-end profiler 212*b* during the profiling session. The interaction can include configuring and controlling the profiling session as well as receiving profiling data. The user can request the resultant profiling data from the back-end profiler 212*b* for display on the display device 108*a*. The back-end profiler 212*b* can open a debugging port to the back-end VM 218 when the front-end profiler 212*a* initiates an online profiling session with the back-end profiler 212*b*. The back-end VM 218 can then wait for a connection. The front-end VM 220 that includes the front-end profiler 212*a* can connect to the debugging port using client API 222 and server API 224 by way of network 106.

In some implementations, in an online profiling session, a user may optionally store the profiling data received from the back-end VM in a local file (e.g., a file located on the client 108 as part of a local file system or repository). The user can access the locally stored profiling data file at any time after the completion of the profiling session.

In some implementations, a user can perform a remote or local profiling session in an offline or non-interactive mode. In an offline profiling session, a front-end profiler (e.g., front-end profiler 212*a*) can initiate a profiling session with a back-end profiler (e.g., back-end profiler 212*b*) but there is no interaction between the front-end profiler (e.g., front-end profiler 212*a*) and the back-end profiler (e.g., back-end profiler 212*b*) during the profiling session. For example, the system 200 can provide an interface to couple the front-end VM 220 to the back-end VM 218 using the server API 224 in order to start and stop the profiling session. The back-end VM 218 that includes the back-end profiler 212*b* can store the profiling data in the database 104, and/or a file. For example, a user interacting with a GUI displayed on the display device 108*a* can start and stop the profiling session. Once complete, the user can request the profiling data stored in the file in the database 104 from the computer system 114 (e.g., the user can interact with a GUI displayed on display device 108*a* to initiate the request). The client 108 can receive the profiling data file and display its contents to the user on display device 108*a*.

In an offline profiling session, storing profiling data for the profiling session in a profiling file on database 104 can enable a user to retrieve profiling data for a back-end VM (e.g., back-end VM 218) at any point after the profiling session is complete. For example, the stored profiling data can be retrieved from the database 104 whether or not the back-end VM (e.g., back-end VM 218) is running.

Figure 3:
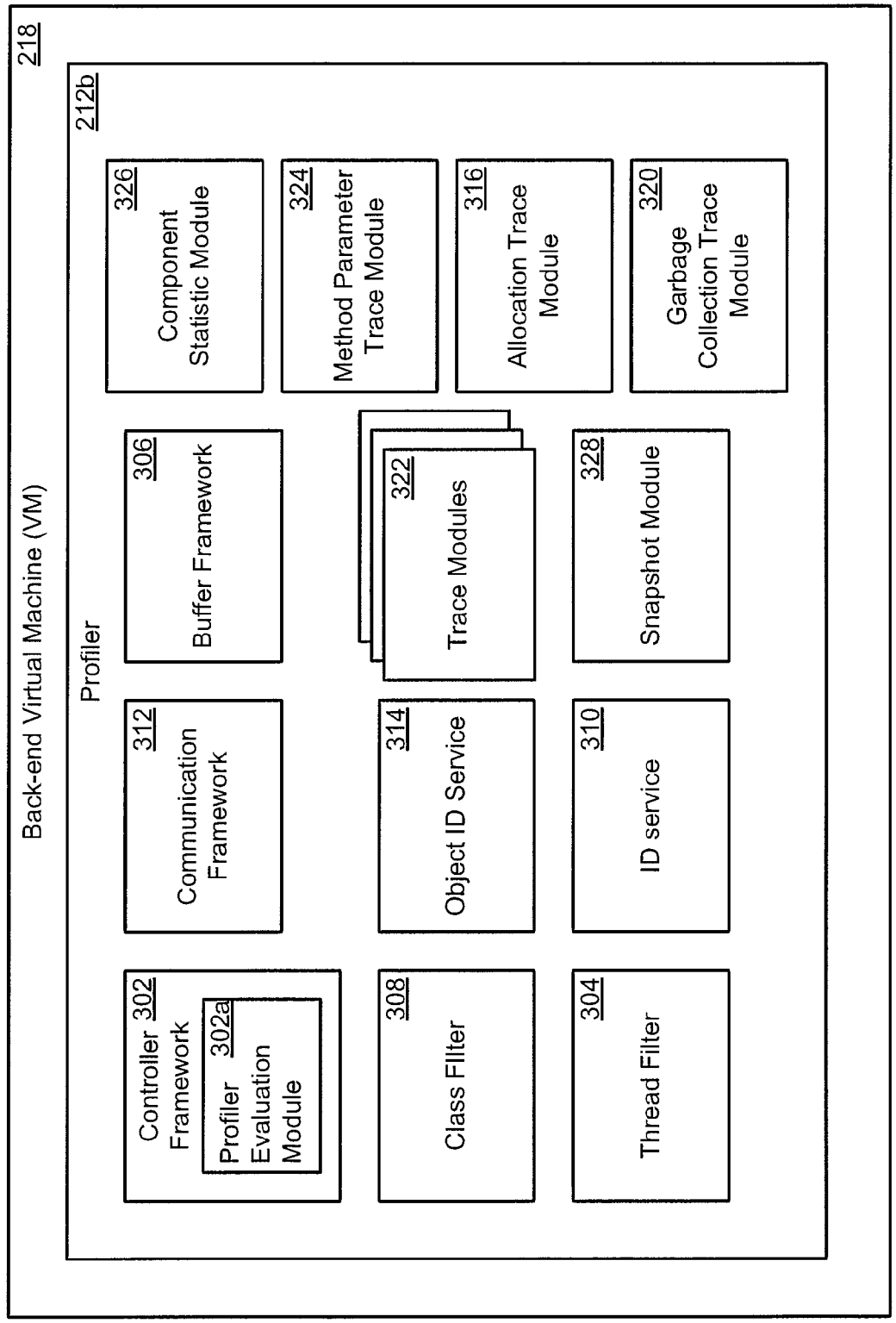
FIG. 3 is a block diagram of an exemplar profiler included in an exemplar back-end virtual machine (VM).

FIG. 3 is a block diagram of an exemplar profiler (e.g., back-end profiler 212*b*) included in an exemplar back-end VM (e.g., back-end VM 218). The back-end profiler 212*b* can include a plurality of profiler modules, filters and frameworks. The back-end profiler 212*b* can include an allocation trace module 316, a method parameter trace module 324 and additional trace modules 322. Each profiler trace module can capture a stream of events that match the criteria of the module (e.g., an allocation trace module can record all memory allocation events in the profiled application).

The back-end profiler 212*b* can include a controller framework 302. In some implementations, the controller framework 302 can start and stop profiling sessions as well as traces during a profiling session. The controller framework 302 can allow a user to select specific back-end profiler options and settings for a profiling session. For example, the front-end profiler 212*a* can display a GUI to the user on display device 108*a* that displays the options and settings for the back-end profiler 212*b*. The user, interacting with the GUI, can select specific back-end profiler options and settings for a profiling session.

The back-end profiler settings can include functional settings and filter settings. Functional profiler settings can determine the functional area of the application code to profile. For example, a functional profiler setting can specify the types of traces to perform for the profiling session (e.g., an allocation trace, a method parameter trace, and/or a performance trace). Filter profiler settings can define a validity scope (e.g., user, session, thread, VM, etc.) for the functional profiler setting for the profiling session. For example, referring to FIG. 2, a user, operating client 108, can start an allocation trace in the back-end profiler 212*b*. The validity scope of the profiling session can be for the user.

The profiler options can include specific monitoring, debugging and analysis functions. For example, profiler options can include memory debugging (e.g., memory leak detection), performance analysis (e.g., hotspot identification), synchronization monitoring, and application debugging (e.g., called method detection). By way of non-limiting example, the profiling functions can include one or more sub-functions (e.g., heap dump, time-based sampling, memory-based sampling, allocation trace, method parameter trace, garbage collection trace, etc.). Allocation analysis can identify and isolate memory related problems in an application. Allocation analysis can be used for memory debugging.

Performance analysis can monitor an application's behavior using information gathered as the application executes. Performance analysis can determine which parts of an application can be optimized for speed. In some implementations, performance analysis can indicate where within the application spent its time during execution thereof. Performance analysis can indicate which methods called other methods while the application executes. The profiling data gathered during a performance analysis can indicate which areas of the application are slower than expected. Performance hotspots (or bottlenecks) can be code segments in the application that can contribute significantly to overall application execution time. In some implementations, a performance hotspot can slow down or halt application execution. Identification of performance hot spots enables improvement of the code segment to improve the overall performance of the code at runtime.

In some implementations, the controller framework 302 may include a profiler evaluation module 302*a* for analyzing profiling data. The server API 224 can obtain the complete profiling data for a profiling session. The profiler evaluation module 302a can analyze the complete profiling data for the profiling session and generate problem oriented, condensed profiling data for the profiling session. The server API 224 can also obtain the condensed profiling data from the back-end VM 218. A user may use the condensed profiling data to identify one or more problematic areas in a profiled application. For example, a profiling session can perform a performance analysis on an application using a time-based sampling approach. The time-based sampling approach for performance analysis can be referred to as a statistical analysis. In some implementations, a profiling session can perform a performance analysis on an application using one or more actual events in the application (e.g., a method call) as indicators for tracing the execution path of the application.

In some implementations, the back-end provides low-level profiling data to the front-end for higher-level evaluation of the profiling data at the front-end. For example, the server 102 can provide the raw profiling data to the client 108. The client 108 can process the raw profiling data to provide a high-level evaluation thereof. In other implementations, the profiler evaluation module 302a can analyze the complete profiling data for a profiling session. The profiler evaluation module 302a can generate condensed profiling data directed towards the identified time-consuming methods within the profiled application. The server API 224 can enable the client 108 by way of network 106 and client API 222 to receive the condensed profiling data from the back-end VM 218. The client 108 can display the condensed profiling data to a user in a GUI on the display device 108a.

In some implementations, a user can use the controller framework 302 to start and stop profiling sessions, and to enable profiler traces for a session. For example, the user can determine one or more profiler traces to enable during a profiling session. In a single profiling session, the user may enable an allocation trace that uses the allocation trace module 316 and a method parameter trace that uses the method parameter trace module 324.

In some implementations, the controller framework 302 can enable the server 102 to specify a thread filter 304. The thread filter 304 can include names and identifiers associated with a profiling session for a particular thread (e.g., a thread executing on the back-end VM 218) and can indicate the existence of one or more profiler traces for the profiling session. For example, the names and identifiers can be a client identifier, a user identifier, a profiling session identifier, a request identifier, an application name and a component name. By way of non-limiting example, the thread filter 304 can filter out specific events in the profiling data (e.g., all allocations from a specified thread). In some implementations, the controller framework 302 can "tag" the names and identifiers to the thread. The server can set the current thread state using the information in the thread filter 304.

Class filters 308 can limit the recording of profiling data for a particular trace to a designated method within a class included in the class filters 308. For example, when enabling an allocation trace in a profiling session, a user can enable a profiler to record allocation trace data for Java object allocations, which refer to instances of the java.lang.HashMap class. The java.lang.HashMap class can be included in the class filter 308.

A buffer framework 306 can compress or decompress profiling data. The compressed or decompressed profiling data can be communicated (e.g., sent to the client 108) or stored (e.g., placed in a profiling file and stored in database 104). For example, in an offline profiling session, the buffer framework 306 can compress profiling data for storage as a profiling file in database 104. When requested by a client (e.g., client 108), the buffer framework 306 can decompress the profiling data in the profiling file for communication back to the client (e.g., client 108) and subsequent viewing of the profiling data by a user in a GUI on a display device (e.g., display device 108a).

Communication framework 312 can facilitate the communication of profiling data and information between and within various components (e.g., elements, modules, systems, servers, VMs, etc.) included in the computer system 114. Additionally, the communication framework 312 can determine and facilitate the storing of profiling data (e.g., profiling data in a profiling file stored in database 104).

An identification (ID) service 310 can assign a numerical identifier to an alphanumeric name. For example, the ID service 310 can assign a numeric identification value to a class name (e.g., java.lang.HashMap class can be assigned the number "101") creating a numeric ID tag for the class. A numerical identifier can also be assigned to a method, a class and/or a class loader. For example, because a class, a method and/or class loader are not just specified by their name (e.g., there can be more classes of the same name, if they are loaded by different class loaders), using just a name to ID mapping would not allow to differentiate between different class, method or class loader of the same name. In some implementations, a mapping packet can map and group classes, methods and/or class loaders according to their numerical ID tags (e.g., their assigned numerical values). In some implementations, the ID service 310 can assign numeric IDs to threads. An object identification (ID) service 314 can assign numeric IDs to objects. The use of numeric IDs can result in improved efficiency and speed during a profiling session as objects, threads, methods and classes can be sorted, grouped and compared using the numeric IDs instead of an alphanumeric name. The use of numeric IDs can also result in decreased memory consumption during a profiling session.

A method parameter trace module 324 can trace the values of method parameters. For example, a method parameter trace can check if specific parameter values used in a method lead to excessively long execution times for the method. Additionally, a method parameter trace can provide an overview of the parameter values used by the method during the execution of the application in a profiling session.

In some implementations, and as noted above, the raw profiling data can be provided to the front-end from the back-end for higher-level processing. For example, the front-end can process the profiling data to group one or more consecutive methods in a stack trace into a component, and categorize the trace data at the stack level. For example, when a profiling session includes a time-based sampled allocation trace, the memory allocation quantity can be attributed to a stack trace. In other implementations, the higher-level processing can occur at the back-end. For example, a component statistic module 326 can group one or more consecutive methods in a stack trace into a component. A component can be a specific application programming interface (API) used by the application. Examples of components can be Java components that can include, but are not limited to, a persistence API, a security API, a portal API and a servlet API. The methods in the stack trace can be grouped into components based on a defined "entry method" for the component. The component statistic module 326 can then categorize the trace data at the stack level. The stack trace including methods can be grouped into components, where one or more consecutive methods can be placed into one component group. Each component group can provide allocation statistics for the API associated with the component.

A garbage collection trace module 320 can trace garbage collection (GC) events in an application. For example, a Java runtime environment can use a garbage collector to perform garbage collection to reclaim no longer needed memory allocated to an object. Once the garbage collector determines that the object is no longer accessible (e.g., when there is no longer any references to it stored in any variables, the fields of objects, or the elements of any arrays), the garbage collector can reclaim the allocated memory. For example, when a Java application no longer references a particular object, a heap space occupied by the object can be recycled so that the heap space can be made available for subsequently created objects.

As discussed in further detail below, the profiling data into sub-regions or snapshots. A snapshot can be a specific time-frame or interval where profiling data was collected. For example, a user can create a snapshot by selecting a corresponding entry within a context menu of a profiling trace entry in a profile view. As another example, the profiling data can be read at the front-end (e.g., after finishing a dialog step) and the user can input a command to create a snapshot. In response, the front-end can send a command to the back-end to create a snapshot of the profiling data. Consequently, the back-end inserts a snapshot marker into the original profiling data. In the case where the user would like to create a sub-snapshot (e.g., a snapshot within a snapshot), or the user would like to create a snapshot from an arbitrary time period, the front-end can identify the corresponding sections, or sub-regions in the original profiling data, and can read the profiling data for that section.

Analysis of profiling data can identify the impact on system performance of individual software modules in an application. For example, profiling data can indicate the percentage of overall runtime for a software module in an application. Optimization of the software modules that contribute a large percentage of the overall runtime can result in marked system improvements with minimal changes. Profiling data can also indicate where within the software module optimization can be performed to improve the module's overall performance in the system.

For example, time-based sampling can provide an overview of methods in an application that consume the most CPU resources. Time-based sampling can provide a stack trace of the currently active thread at regular intervals. Analysis of time-based sampling can identify a method that consumes a large number of CPU or system resources. For example, the consumption of a large number of system resources by the method can be the result of an expensive method call. For example, the consumption of a large number of system resources by the method can also be the result of calling the method often. A method statistic trace, which can be included in a module with trace modules 322, for example, can determine the number of times a particular method is called. The method statistic trace together with time-based sampling can provide a time method trace that can calculate the average runtime of a specific method (e.g., the "cumulative time" divided by the method count).

For example, memory-based sampling can provide an overview of methods in an application that consume the most memory resources. Memory-based sampling can provide a stack trace after memory is allocated on a memory heap. Memory-based sampling can identify the methods that allocate the largest number of bytes on the memory heap.

Input/output (I/O) based sampling can provide an overview of I/O operations performed and I/O resources used by methods in an application. For example, operating a network connection at its maximum bandwidth can consume a large percentage of I/O resources. An I/O trace, which can be included in a module with trace modules 322, for example, can trace the timing of I/O operations in a method. The I/O trace can provide data about I/O operations, as well as data about a file being written and/or the network address/port being used. Analysis of the I/O trace data can provide information about I/O operations that can include, but is not limited to, the amount of data transmitted by an I/O operation, the amount of CPU resources used by an I/O operation, and the number of I/O operations performed by a method. The analysis of the I/O trace data can identify I/O operations that transmit an excessive amount of data. The analysis of the I/O trace data can identify I/O operations that consume an excessive number of CPU resources. The analysis of the I/O trace data can identify if a method performs an excessive number of I/O operations.

Synchronization monitoring of a software application can provide information related to multithreading and concurrency. For example, problems associated with multithreading and concurrency can include, but are limited to, deadlocks, race conditions, thread starvation and scalability. In some implementations, a monitor trace, which can be included in a module with trace modules 322, for example, can identify deadlock and scalability issues in an application by acquiring information about the locks used in a VM. Synchronization monitoring can provide an overview of the most contented locks within an application. In this manner, a user can be made aware of which threads are waiting (e.g., threads that explicitly call wait( ) on a Java object/monitor) and which threads are blocked (e.g., threads that want to enter a monitor section), as well as how long the threads are typically waiting and/or blocked. Further information can be provided with regard to the waiting and/or blocked threads. For example, culprit threads can be identified, a culprit thread being a thread that is holding the desired locks.

In some implementations, software profiling can provide additional application debugging functionality. For example, a method count trace, which can be included in a module with trace modules 322, for example, can provide the number of calls to a particular method. An execution line trace, which can be included in a module with trace modules 322, for example, can provide information regarding the number of lines of executed and unexecuted application source code. A method call trace, which can be included in a module with trace modules 322, for example, can provide the methods called by an application.

In some implementations, a method trace can be implemented to trace an application debugging process. The method trace, which can be included in a module with trace modules 322, for example, can trace the application program flow to a designated point in the source code. The method trace can provide information as to how the application program reached the designated point in the source code.

Referring to FIGS. 1 and 2, the client 108 can provide a GUI to a user for display on display device 108*a* that can allow the user to start, stop and control profiling sessions in the back-end profiler 212*b* using the client API 222 in communication with the server API 224 by way of network 106. Additionally, the server API 224 can provide the client API 222 by way of network 106 profiling data to display to the user in a GUI on the display device 108*a*. The user can access and evaluate the displayed profiling data. In some implementations, a guided mode can identify problem areas indicated by the profiling data. In some implementations, the profiling data can be stored as a profiling file in the database 104 in the computer system 114. In some implementations, the profiling data can be stored as a file in a file system included on the client 108. Storing of the profiling data can allow for subsequent retrieval and analysis.

The client 108 and the client 110 can connect to the computer system 114 by way of the network 106. In some implementations, the back-end profiler 212*b* can perform in compliance with both the client 108 and the client 110, simultaneously, while remaining multiple client compliant. The back-end profiler 212*b* can restrict profiling sessions to particular clients, while the server 102 can assign the current client information to its respective thread.

Figure 4:
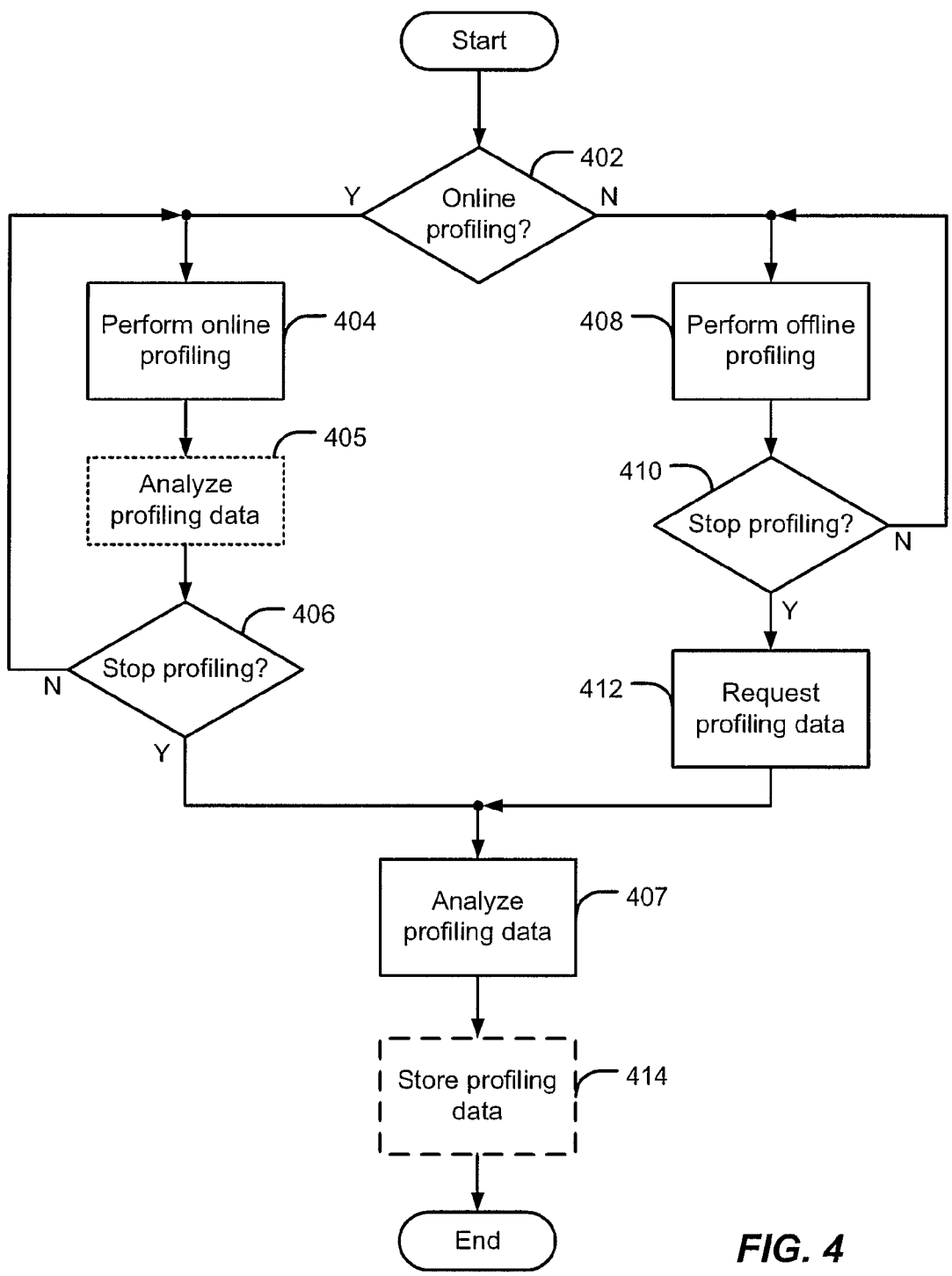
FIG. 4 is a flowchart illustrating exemplar steps that can be executed by a front-end profiler on a client for a profiling session.

FIG. 4 is a flowchart illustrating exemplar steps 400 that can be executed by a front-end profiler on a client (e.g., front-end profiler 212*a* on client 108 in FIG. 2) for a profiling session. In step 402, it is determined whether the profiling session will be an online (e.g., interactive mode) profiling session. If the profiling session is to be an online profiling session, interactive profiling is performed in step 404. The profiling data can be analyzed during the profiling session in optional step 405. The online profiling session continues until stopped. In step 406, it is determined whether the online profiling session is to be stopped. Whether the online profiling session is to be stopped can be determined based on a user input at the front-end. If the online profiling session is not to be stopped, the interactive profiling continues in step 404. If the online profiling session is to be stopped, the profiling data can be analyzed by the front-end profiler in step 407.

If, in step 402, if it is determined that the profiling session is not an online profiling session, offline (e.g., non-interactive) profiling is performed in step 408. The offline profiling session continues until stopped. In step 410, it is determined whether the offline profiling session is to be stopped. Whether the offline profiling session is to be stopped can be determined based on a user input at the front-end. If the offline profiling session is not to be stopped, the offline profiling session continues in step 408. If the offline profiling session is to be stopped, the front-end profiler requests the profiling data in step 412. In step 407, the profiling data can be analyzed by the front-end profiler. In step 414, which can be provided as an option, the profiling data can be stored locally in the client for future use by the front-end profiler (e.g., front-end profiler 212*a*).

In some implementations, a front-end profiler can provide a user with tools for analyzing profiling data (e.g., resource consumption information) gathered by a back-end profiler. The tools can be included in the front-end profiler. The tools can provide a GUI to the user (e.g., referring to FIGS. 1 and 2, a GUI can be displayed on display device 108*a*). The GUI can allow the user to select criteria for grouping and managing the profiling data in an efficient and meaningful way in order to simplify the analysis of the profiling data.

For example, the IDE of the software development platform (e.g., Eclipse) can be structured into a plurality of perspectives. As used herein, the term perspective refers to a visual container for a set of views and editors for the associated development task that can properly structure and arrange the views, and can be analogous to a page within a book, for example. Examples of perspectives can include, but are not limited to, a perspective for implementing a software application, a debug perspective for debugging functionality, a test perspective for implementing software application testing, and a profiler perspective for profiling functionality. The platform can associate a development task (e.g., source code implementation, debugging, testing, profiling) with a dedicated perspective. The development framework can provide an interface for combining user-made perspectives together with their related content. For example, the development framework can provide a GUI to display to a user on a display device that can combine a profiler perspective with profiling data.

The IDE of the software development platform (e.g., Eclipse) can provide the functionality to execute or debug a software application by providing one configuration framework for executing the application and another configuration framework for debugging the application. Both configuration frameworks can describe the selected application (e.g., a main class to start, start-up parameters, etc.). Another configuration framework can be included to profile an application, and provides a user interface framework that can start a profiling session.

In some implementations, multiple configuration framework types can be provided. Example configuration framework types can include an application configuration framework, a profiling file analysis configuration framework, and a remote profiling configuration framework. The application configuration framework can specify an application (e.g., a Java application) for profiling together with profiling parameters. For example, the application configuration framework can enable a user to execute an application with a profiling session already started. A user can profile the application directly from the start of execution of the application.

Figure 5:
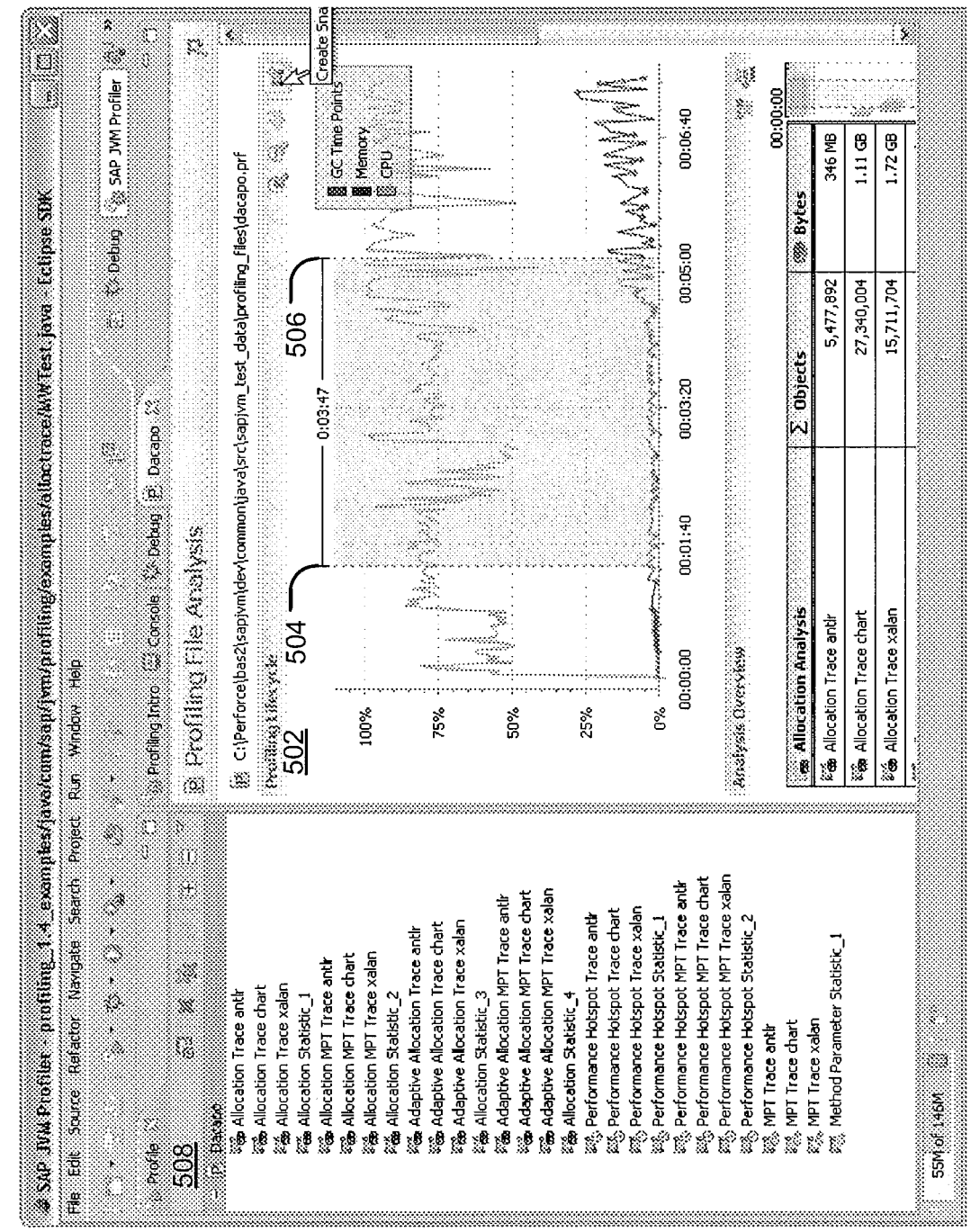
FIG. 5 is a screen-shot illustrating an exemplar profiler perspective for a VM.

Referring now to FIG. 5, a screen-shot 500 illustrates an exemplar profiler perspective for a VM. As described above, a development framework can provide a GUI to display to a user on a display device, as illustrated by the screen-shot of FIG. 5, for example, that can combine a profiler perspective with profiling data. The screen-shot of FIG. 5 illustrates a portion of an exemplar profiling lifecycle 502, for which a snapshot is provided between a starting point 504 (e.g., at 1 minute, 40 seconds) and an ending point 506 (e.g., at 5 minutes). The snapshot functionality is described in further detail below. The profiler perspective can include a profiler view 508 for a profiling session (e.g., the Example profiling session).

Referring again to FIG. 2, the profiling file analysis configuration framework can provide a user with a GUI on a display device (e.g., display device 108*a*) in order for the user to specify a profiling file for display. As previously described, a profiling file can include collected profiling data. The profiling file can be in a database on a server (e.g., database 104) or in a file system on a client (e.g., client 108). For example, the IDE can save profiling data from an interactive profiling session in a profiling file on the client that includes the IDE (e.g., client 108). For example, profiling data from a non-interactive profiling session can be saved in a profiling file included in a database (e.g., database 104) included on a server (e.g., server 102). For example, the front-end profiler 212*a* can provide the back-end profiler 212*b* specific profiling parameters that enable traces to begin directly on the start-up of the application for profiling in the back-end VM 218. The profiling data can be stored in a profiling file on database 104. A user on a client (e.g., client 108) can view the profiling file on a display device (e.g., display device 108*a*) by generating a profiling file analysis configuration framework.

With further reference to FIG. 2, the remote profiling configuration framework can allow a user to specify a connection (e.g., a host name and port number) to the VM (e.g., back-end VM 218) for profiling. For example, as previously described, a back-end profiler (e.g., back-end profiler 212*b*) can open a debugging port to a back-end VM (e.g., back-end VM 218) when a front-end profiler (e.g., front-end profiler 212*a*) initiates an online profiling session with the back-end profiler (e.g., back-end profiler 212*b*).

Figure 6:
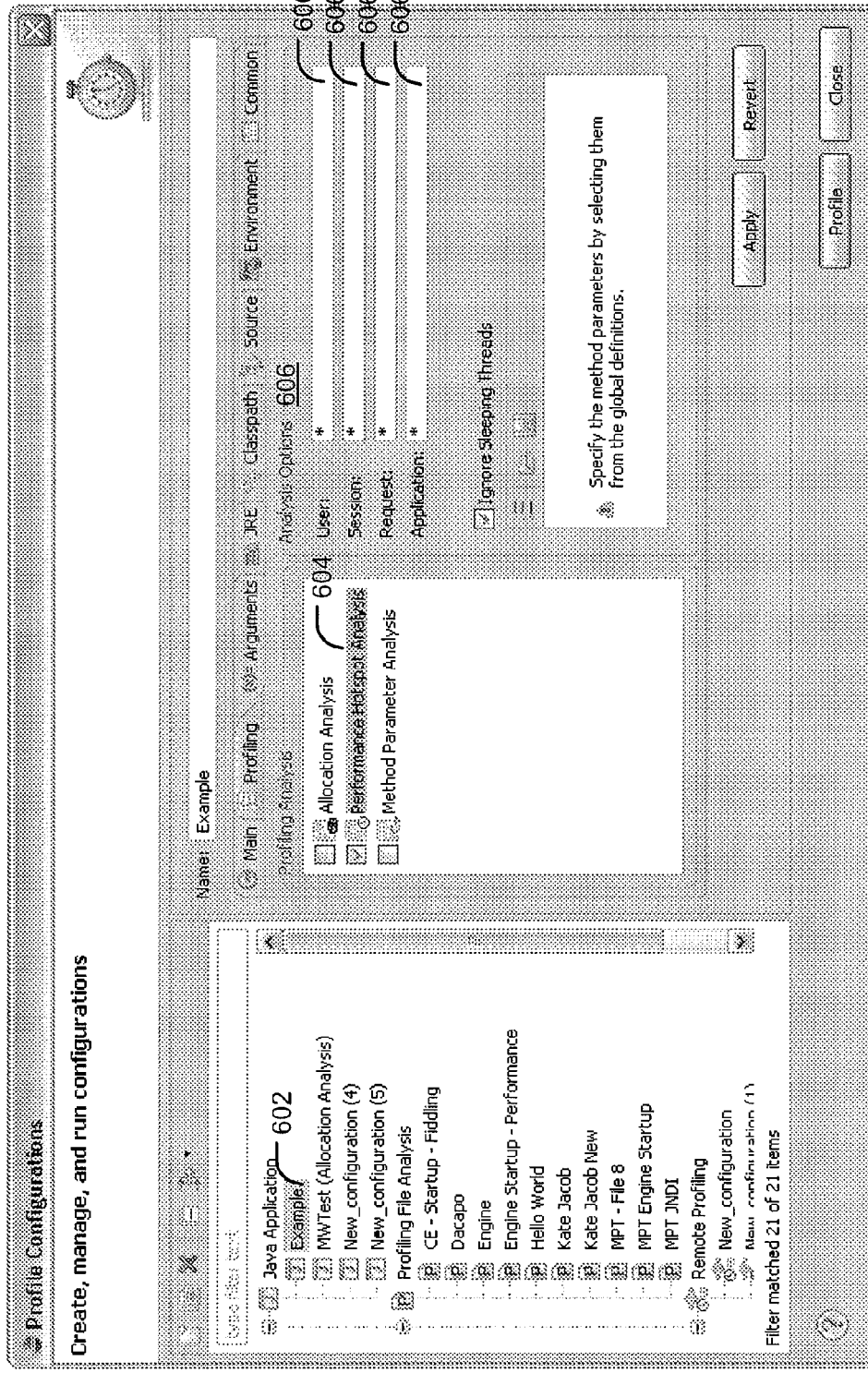
FIG. 6 is a screen-shot illustrating an exemplar graphical user interface (GUI) used to configure a profiler and start a profiling session.

Referring now to FIG. 6, a screen-shot 600 illustrates an exemplar GUI that can be used to configure a profiler and start a profiling session. For example, and with co-reference to FIG. 2, a user can select to profile an application (e.g., Java application: Example 602) running on the back-end VM 218 using back-end profiler 212*b*. The user can select to analyze the performance behavior of the application (e.g., the user can select Performance Hotspot Analysis 604). The performance behavior of the application can involve method calls and execution paths, which can consume the majority of the CPU resources. The profiling data can include the method calls and execution paths used by the application. In order to profile the application, a user can create an application configuration framework in an IDE running on a client (e.g., client 108). As described, the application configuration framework can allow the user to execute the application with a profiling session already started. The user can profile the application directly from the start of execution of the application. Within the application configuration framework, a user can specify a class containing the main method of the application and enable a performance hotspot analysis profiling trace. The performance hotspot analysis profiling trace can provide the user with information that can indicate performance hotspots within the application.

Analysis options 606 can include information such as a user name or identifier option 606*a*, a session name or identifier option 606*b*, a request name or identifier option 606*c* and an application name or identifier option 606*d*. For example, the analysis options 606 can indicate the user, session, requester or application that can start a profiling session. A server (e.g., server 102) can tag one or more threads running on a VM (e.g., back-end VM 218) with the analysis options 606. When a profiling session is started (e.g., a user on client 108 interfaces with a GUI on display device 108*a* to enable the front-end profiler 212*a* to initiate a profiling session), a thread filer (e.g., thread filter 304 in FIG. 3) included in the a back-end profiler (e.g., back-end profiler 212*b*) can process the analysis options 606. The thread filter (e.g., thread filter 304) and the back-end profiler (e.g., back-end profiler 212*b*) can determine, for example, if the user name or identifier option 606*a* matches the user of the client 108.

In some implementations, the analysis options 606 can be alphanumeric names associated with each option (e.g., options 606*a-d*). In some implementations, an abbreviated numeric identifier can be used for each option (e.g., options 606*a-d*) where each abbreviated numeric entry corresponds to a longer alphanumeric entry for the options 606*a-d*.

Referring again to FIG. 2, once a server (e.g., server 102) begins the execution of an application in a VM (e.g., back-end VM 218), a back-end profiler (e.g., back-end profiler 212*b*) can monitor at regular intervals what the application is executing. For example, back-end profiler 212*b* can record profiling data that includes a complete stack trace for all threads running in the application on the back-end VM 218. The server API 224 by way of network 106 and client API 222 can transfer the profiling data to the front-end profiler 212*a*. For example, in order to obtain an accurate view of the performance behavior of the application, the back-end profiler 212*b* can perform and record a stack trace computation every ten milliseconds. This can result in the back-end profiler 212*b* recording and transferring a large amount of profiling data to the front-end profiler 212*a* especially when the application is large and executes for a prolonged period.

In some implementations, the front-end profiler 212*a* can maintain profiling data it receives in main memory on the client 108. In some implementations, if the front-end profiler 212*a* receives a large amount of profiling data compared to the available amount of main memory on the client 108, the front-end profiler 212*a* may store the profiling data in a file on the file system of the client 108. In this case, some statistical or aggregated profiling data values (e.g., the profiling session duration time) may be presented to the user on a real-time basis in a dedicated profile view (e.g., profile view 508 in FIG. 5) included in the IDE of the software development environment on the client 108. The remaining profiling data can be stored in a file on the file system of the client 108 for later viewing and analysis by the user in a GUI on display device 108*a*.

Figure 7:
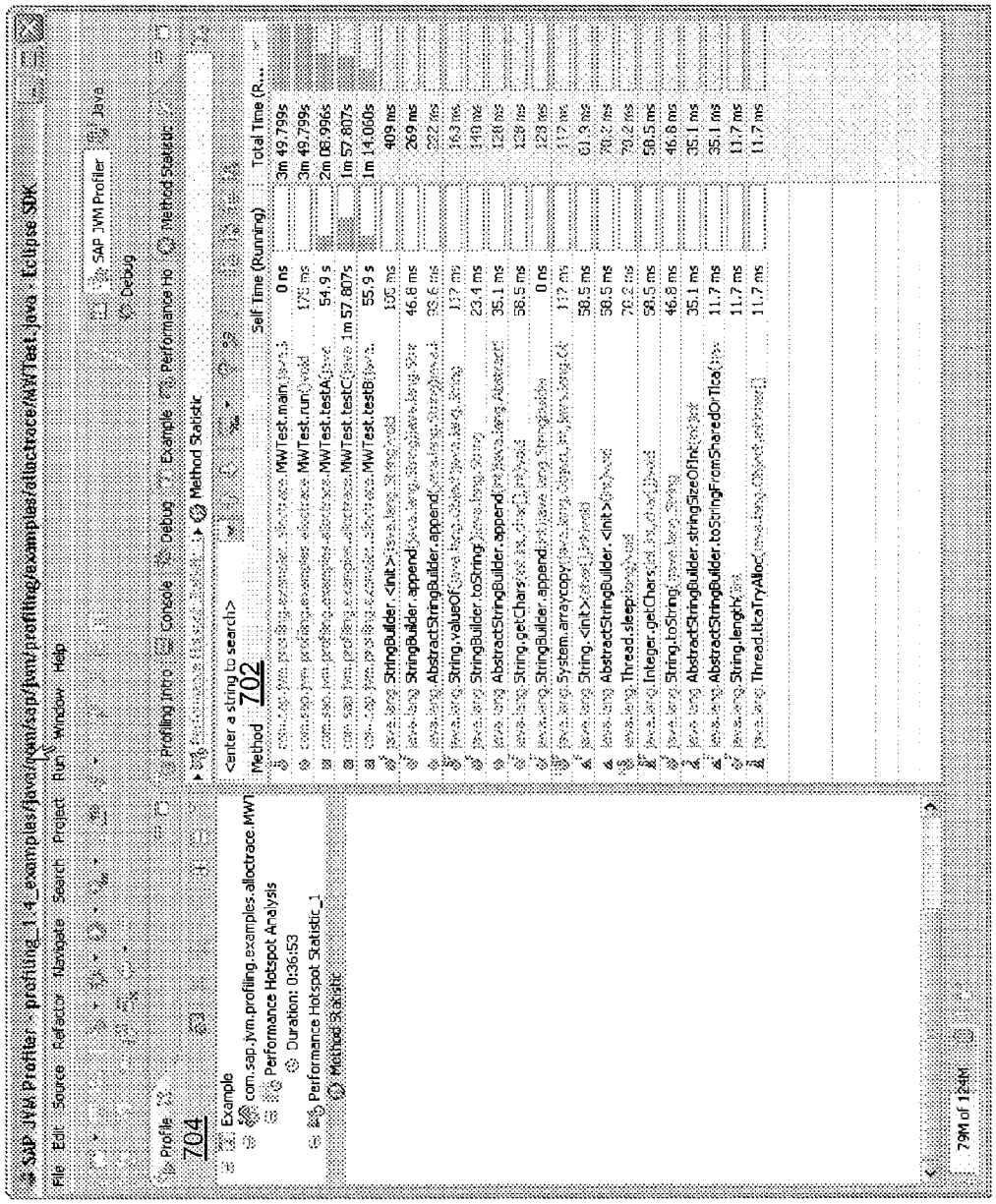
FIG. 7 is a screen-shot illustrating an exemplar method statistic view included in a profiler perspective.

Referring now to FIG. 7, a screen-shot 700 illustrates an exemplar method statistic view 702 included in a profiler perspective. The method statistic view 702 can be used to identify performance hotspots, and provides an overview of the methods that consume the most CPU resources of an application. As described above, a performance hotspot analysis can dump a stack trace of the currently active threads at regular intervals (e.g., every 10 milliseconds). For each method, the front-end profiler (e.g., front-end profiler 212*a*) can calculate the percentage of how often a method appears on the top of the stack trace. This percentage can be the self-time for the method. The front-end profiler (e.g., front-end profiler 212*a*) can use the method self-time to estimate the amount of time the application spends processing the method. Additionally, for each method, the front-end profiler (e.g., front-end profiler 212*a*) can calculate the percentage of how often a method appears at any location in the stack trace. This percentage can be the total time for the method and can denote the amount of time the application spends processing the method, which includes any calls the method made to other methods.

In the example of FIG. 7, a user can select a called methods (hierarchical) entry point. A profiler perspective on a front-end profiler (e.g., front-end profiler 212*a*) can open the method statistic view 702. The method statistic view 702 can include a hierarchical list of methods called during the snapshot of the performance analysis (e.g., a method statistic of a performance hotspot statistic). The method statistic view 702 can list the called methods based on the total run time of each of the called methods during the snapshot of the performance analysis.

For example, a profiler can create a statistic view for each entry point. The profiler can determine the statistics for display in the statistic view by parsing original profiling data included in a profiling file. For example, a profiling file can be stored on a file system of a client (e.g., client 108) running a front-end profiler (e.g., front-end profiler 212*a*). A front-end profiler (e.g., front-end profiler 212*a*) can parse original profiling data in the profiling file, determine requested data for display in a statistic view based on the entry point for the snapshot, and provide the requested data for the statistic view. The requested data for the statistic view can be stored in main memory for use by the front-end profiler (e.g., front-end profiler 212*a*) and can be stored in a file on the file system. When the front-end profiler (e.g., front-end profiler 212*a*) closes the statistic view, the front-end profiler (e.g., front-end profiler 212*a*) can delete the profiling data for the statistic view from the main memory of the client, leaving the stored data for the statistic view in a file on the file system. If the front-end profiler (e.g., front-end profiler 212*a*) reopens the statistic view, the front-end profiler (e.g., front-end profiler 212*a*) can read the data for the statistic view from the stored file without the need to parse the original profiling file.

For example, original profiling data received by a front-end profiler (e.g., front-end profiler 212*a*) from a back-end profiler (e.g., back-end profiler 212*b*) can include stack trace information for all threads running on a VM (e.g., back-end VM 218). The back-end profiler (e.g., back-end profiler 212*b*) can sample and record the stack thread information for a stack trace at pre-defined intervals (e.g., every 10 msecs).

More specifically, a stack trace includes several stack frames, each stack frame including the individual methods and corresponding line numbers. When the states of the threads are sampled, a complete stack trace is determined for each individual thread. This occurs at the pre-defined interval (e.g., every 10 msecs) depending on the underlying operating system. In order to determine the runtimes of the individual methods, the pre-defined interval is accounted to each stack frame (e.g., the actual method and corresponding line number) of a stack trace. More specifically, the runtime of a method is separated into a self time and a total time. The self time indicates the time spent directly within a specific method, whereas the total time indicates the time spent within a specific method plus the time spent in called methods. Accordingly, if a sampled stack trace is determined, the pre-defined interval (e.g., every 10 msecs) is accounted to the total runtimes of each individual stack frame. The method at the top of the stack trace includes the pre-defined interval added to its self time.

The above-described process can be time consuming dependent on the amount of profiling data. The amount of profiling data can depend on the size of the application running on the VM (e.g., back-end VM 218) along with the amount of time the application is running while being profiled. However, the amount of memory required for storing the resultant method statistic can be significantly smaller than the amount of memory required for storing the original profiling data.

The original profiling data provides the complete stack trace for each individual thread. The method statistic can include aggregated data from the original profiling data. The method statistic can provide an overview of the total runtime for each method. Referring again to FIG. 7, an exemplary method statistic view 702 in a profiler perspective is shown. For example, a front-end profiler (e.g., front-end profiler 212*a*) can display to a user the method statistic view 702 on a display device (e.g., display device 108*a*) on a client (e.g., client 108). The front-end profiler (e.g., front-end profiler 212*a*) can store the aggregated data of the method statistic in main memory to a file located on the client (e.g., client 108). When the user closes the method statistic view 702, the aggregated data of the method statistic can be removed from main memory on the client (e.g., client 108) but can still remain on the client (e.g., client 108) in a file on the file system of the client (e.g., client 108). When the user selects the method statistic entry point, the front-end profiler (e.g., front-end profiler 212*a*) can display the method statistic view 702 on the display device (e.g., display device 108*a*) to the user. The front-end profiler (e.g., front-end profiler 212*a*) can obtain the aggregated data of the method statistic from the stored file on the file system of the client (e.g., client 108) without the need to recreate the method statistic from the data included in the original profiling file. This can save the front-end profiler (e.g., front-end profiler 212*a*) a significant amount of processing time.

In some implementations, the front-end profiler (e.g., front-end profiler 212*a*) can store the aggregated data for the method statistic along with the method statistic view. Storing the method statistic view can include storing the last state of the view prior to the user closing the view (e.g., storing the sort directions, the selection state, the expanded state of trees, etc.). When the user selects the method statistic entry point, the front-end profiler (e.g., front-end profiler 212*a*) can display the method statistic view (e.g., method statistic view 702) on the display device (e.g., display device 108*a*) to the user in the state that the view was in when the user previously closed the view.

In some implementations, a front-end profiler (e.g., front-end profiler 212*a*) can store profiling data for a profiling session in a file system on a client (e.g., client 108). When a user closes the IDE of the software development platform (e.g., Eclipse), the profiling data can remain in the file on the file system. Additionally, the state of the IDE when closed can also be saved. When the user reopens the IDE, the complete state of the GUI for the IDE can be restored (e.g., profiling sessions, opened views, view states, available statistics, etc.) along with the profiling data for the profiling session.

Figure 8:
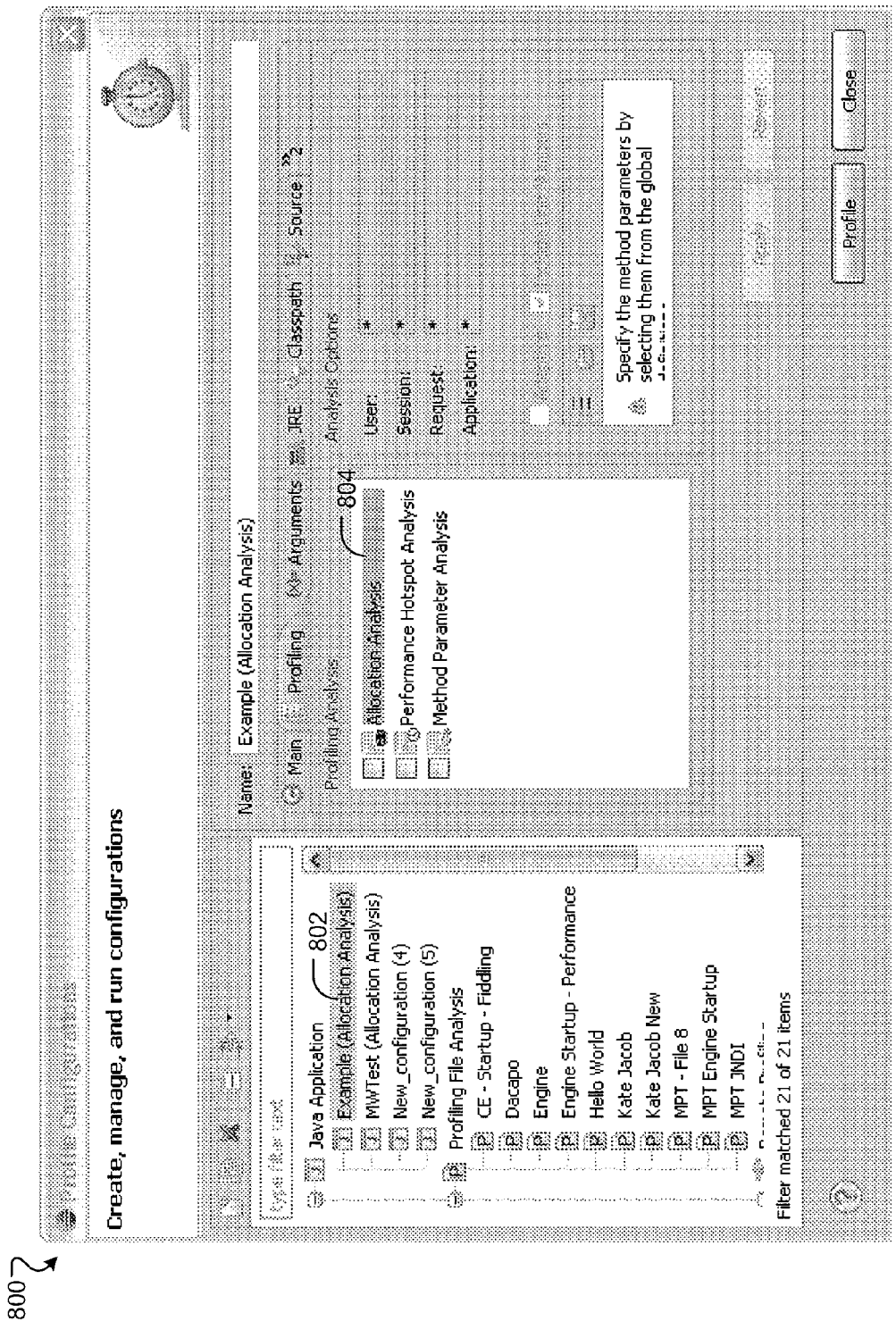
FIG. 8 is a screen-shot illustrating an exemplar GUI used to configure a profiler and start an alternative profiling session.

Referring now to FIG. 8, a screen-shot 800 illustrates an exemplar graphical user interface (GUI) used to configure a profiler and start an alternative profiling session. For example, and with co-reference to FIG. 2, a user can select to profile an application (e.g., Java application: Example 802) running on the back-end VM 218 using back-end profiler 212*b*. The user can select to analyze application execution to identify memory related problems (e.g., the user can select Allocation Analysis 804). In order to profile the application, the user can create an application configuration framework in an IDE running on a client (e.g. client 108). As described, the application configuration framework can allow the user to execute the application with a profiling session already started. The user can profile the application directly from the start of execution of the application. Within the application configuration framework, a user can specify a class containing the main method of the application and enable an allocation analysis profiling trace. The allocation analysis profiling trace can provide the user with information related to the memory consumption by the application.

Referring now to FIG. 9, a screen-shot 900 illustrates an alternative exemplar method statistic view 902 included in a profiler perspective is shown. Once the profiling session is complete, a user can select a view for a method statistic. A profiler perspective on a front-end profiler (e.g., front-end profiler 212*a*) can open the method statistic view 902. The method statistic view 902 can display the methods in an application that performed memory allocations during the profiling session.

In some implementations, a profiler perspective can present a plurality of views to a user. Each view can include specific statistics about a profiling session. A front-end profiler (e.g., front-end profiler 212*a*) can uniquely identify and describe the statistics in the view. The unique identification of the statistics can allow a user to navigate from one statistic to other statistics.

For example, using an arbitrary number of navigation steps, a user can start at a first statistic in a first view. The front-end profiler (e.g., front-end profiler 212*a*) can generate the first statistic from a first set of first profiling events identified in the profiling data. The user can select an arbitrary number of displayed entries for the first statistic from the first view. The user can navigate to a second statistic in a second view. The front-end profiler (e.g., front-end profiler 212*a*) can generate the second statistic for the second view from a second set of second profiling events. The second set of second profiling events can include the first profiling events minus the constraints introduced by the selection of the items from the first statistic in the first view. A user can continue to select an arbitrary number of displayed entries from one view and navigate to a next view. The front-end profiler (e.g., front-end profiler 212*a*) can efficiently describe the statistic for each view in an abstract and unique manner to reflect the path to the statistic.

In some implementations, a resource name can uniquely describe a statistic for a profiler in an abstract manner. The resource name can include one or more resource name elements. A resource name element can describe a constraint or filter used to determine the set of profiling events.

For example, a profiling session can produce profiling data that refers to memory allocation events. The front-end profiler (e.g., front-end profiler 212a) can generate a method statistic from a first set of first profiling events identified in the profiling data. A view for the method statistic can display to a user all methods in which memory allocations occurred. FIG. 9 shows an exemplar method statistic view 902. The front-end profiler (e.g., front-end profiler 212a) can apply a type of filter to the profiling data that filters out all methods in which memory allocations occurred. The resource name for the method statistic can include a single resource name element (e.g., "Method Statistic"). The user can select a method from the method statistic view (e.g., java.util.AbstractList.Iterator( )) and navigate to a view for an allocated object statistic for the selected method. The allocated object statistic view can show the type (e.g., class) of allocated objects created by the selected method as well as allocated objects created by one or more methods called from the selected method. The resource name for the allocated object statistic can include the resource name elements of the parent statistic plus additional resource name elements. For example, the resource name for the allocated object statistic can include the resource name element for the method statistic (e.g., "Method Statistic"), a filter resource name element for the selected methods (e.g., "java.util.AbstractList.Iterator( )"), and a resource name element for the allocated object statistic (e.g., "Allocated Object Statistic").

The user can select one or more allocated object types from the allocated object statistic view (e.g., allocated objects for string functions) and navigate to a view for a thread statistic. The thread statistic view can show the threads where the objects selected from the allocated object statistic are allocated. For example, the resource name for the thread statistic can begin with the resource name elements of the parent statistic (the view that the user selections originated from (e.g., the allocated object statistic)). Additionally, a filter resource name element for the allocated object statistic (e.g., "String Functions") and a resource name element for the thread statistic (e.g., "Thread Statistic")) can be appended to the resource name elements of the parent statistic.

As shown in the above examples, a naming scheme for a resource name can directly reflect the navigation steps of the user (e.g., resource name: Method Statistic_java.util.AbstractList.Iterator( )_Allocated Object Statistic_String Functions_Thread Statistic). The resource name can uniquely describe a statistic. For example, a user can compare profiling statistics by comparing the resource elements in their resource names. In this manner, a user can identify identical profiling statistics.

For example, a front-end profiler (e.g., front-end profiler 212a) can create a third profiling statistic from a selection within a second profiling statistic where the second profiling statistic was created by a selection from within a first profiling statistic. In some implementations, the front-end profiler (e.g., front-end profiler 212a) can create the third profiling statistic by starting with the original profiling data and creating the first profiling statistic by applying a first filter for the first profiling statistic to the original profiling data. Applying the first filter for the first profiling statistic to the original profiling data can filter out profiling events in the original profiling data that do not meet the requirement for selection for the first profiling statistic. This results in a first set of profiling events. The front-end profiler (e.g., front-end profiler 212a) can create a second profiling statistic from the first profiling statistic by applying a second filter for the second profiling statistic to the first set of profiling events resulting in a second set of profiling events. The front-end profiler (e.g., front-end profiler 212a) can create the third profiling statistic from the second profiling statistic by applying a third filter for the third profiling statistic to the second set of profiling events resulting in a third set of profiling events. If a user chooses a navigation depth through the profiling data of n times, the profiling data and resultant profiling events are parsed n times. This can consume a large amount of system resources.

In some implementations, a software component for creating profiling statistics can be included in a front-end profiler (e.g., front-end profiler 212a). The profiling statistic creator software component can parse a resource name to compute the filter constraints used to create a view for a statistic described by the resource name. For example, a resource name can include one or more resource name elements for filtering threads. The profiling statistic creator software component can parse the resource name, extract all filter elements from the resource name and create a single thread filter. Additionally, the profiling statistic creator software component can parse the resource name and group resource name elements of the same type to create a single filter. In this case, if a user has chosen a navigation depth through the profiling data of n times, the profiling statistic creator software component can parse the profiling events once, check each profiling event and determine if all of the filter types apply to the profiling event. Additionally, the profiling statistic creator software component can group resource name elements of the same type to create a single filter for each type in order to create the profiling statistic.

In some implementations, a JVM profiler can profile a Java application running on a local or remote host. Within a remote profiling session, a user can directly connect to the JVM. The user can interactively configure the profiling session and request profiling data. For example, the user can request a class statistic and directly see a view of the class statistic on a display device on the local host that includes a front-end profiler (which can be a plug-in to a software development environment (e.g., Eclipse)). As previously described, the profiling events for a statistic can be used as an input for additional requests for statistics.

Referring again to FIG. 9, and as discussed above, a profiler can be implemented to track the resource consumption and collect corresponding profiling data for an executing application. The profiling data can be collected at the method level (e.g., data regarding memory usage and CPU load corresponding to each method called in an executing application can be collected). In some implementations, an allocation trace is provided, in which a profiler (e.g.,) tracks every allocation in the profiled application, including a method call stack. The method call stack is a stack data structure that stores information about the active methods of an application. More specifically, the method call stack includes active methods of a thread, which thread can be a thread used by a particular application. The allocation trace enables direct and indirect profiling data (e.g., memory consumption) to be attributed on a method-by-method basis at the method level. An exemplar flat representation of memory consumption profiling data is illustrated in FIG. 9.

As seen in the exemplar memory consumption profiling data of FIG. 9, the top-most methods include those doing the most memory allocations during one click in an application server, for example, and are called by a component involved in a request generated upon activation of the component. A component can include an object having a graphical representation that can be displayed on a screen, and through which a user can interact with the executing application.

Examples of components include buttons, checkboxes, and scrollbars of a GUI. The exemplar illustration of FIG. 9 provides a fine, method-by-method view of the profiling data. The illustration of FIG. 9, however, does not provide more coarse profiling data information (e.g., how much memory was used for database queries, a cache, or a web container).

Figure 10:
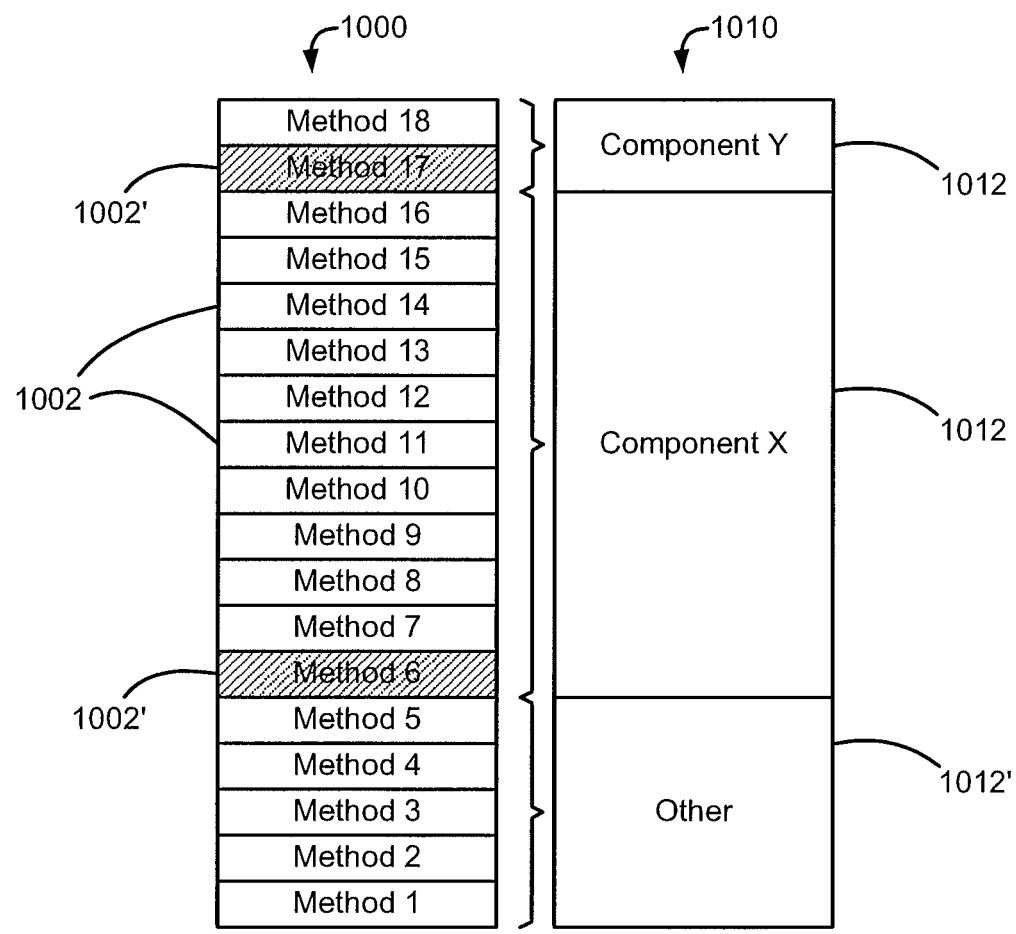
FIG. 10 is a block diagram illustrating an exemplar method call stack and a corresponding component stack.

With particular reference to FIGS. 10-12, the present disclosure provides component statistics that enable a more coarse view of profiling data. More specifically, instead of viewing the profiling data at the method level, implementations of the present disclosure enable the profiling data to be viewed at the component level (e.g., on a component-by-component basis). Starting from the exemplar illustration of FIG. 9, a user may be interested in splitting the profiling data, in this case memory allocation, between a web container, a database, and the like, for example. This cannot be accomplished by categorizing the allocating methods in one category, because not all of the called methods can be attributed to one component.

The component statistic of the present disclosure works at the stack level, and not the method level. More specifically, and in the exemplar case of the allocation trace or time-based sampling, the measured quantity can be attributed to a method call stack. Using the method call stack, a statistic can be generated on a method-by-method basis, as illustrated in FIG. 9. Implementations of the present disclosure enable the method call stack to be transformed to a component call stack, wherein each component in the stack includes one or more of the called methods. In this manner, the profiling data can be attributed to one or more components by grouping a set of methods in the method call stack into one component. Consequently, each component includes the aggregate profiling data of one or more methods that are assigned to the component.

With particular reference to FIG. 10, an exemplar method call stack 1000 is illustrated and includes a plurality of methods 1002 that are called during the execution of a corresponding exemplar application. The exemplar methods 1002 include Method 1 to Method 18, where Method 1 is the first called method during execution of the application, and Method 18 is the last called method. Accordingly, the exemplar method call stack 1000 of FIG. 10 is read in sequential order from the bottom up, with the bottom-most method being the earliest called method 1002, and the top-most method being the latest called method 1002.

As discussed in detail herein, a component call stack 1010 can be provided based on the method call stack 1000. More specifically, the component call stack 1010 can be generated based on the method call stack 1000, or the method call stack 1000 can be transformed into the component call stack 1010. The component stack trace 1010 includes a plurality of components 1012 (e.g., Component X, Component Y), and a special component 1012' (e.g., Other). Beginning with the method call stack 1000, consecutive methods 1002 are grouped based on a corresponding component 1012, as discussed in further detail below into a group. In the exemplar illustration of FIG. 10, there is no component corresponding to Method 1 through Method 5. Consequently, Method 1 through Method 5 are grouped in Other 1012'. Method 6 through Method 16 correspond to Component X 1012, and Method 17 and Method 18 correspond to Component Y 1012.

To group the methods 1002 into components 1012, it is first determined which components of a particular application are of interested. For example, an application can include a plurality of components, only a sub-set of which are deemed to be components of interest. Exemplar components can include, but are not limited to, a servlet, an XML parser, a logging framework and a database connectivity driver (e.g., JDBC driver). In some applications, a component can use other components. By way of non-limiting example, a servlet container can use a JDBC driver and/or an XML parser. A user may be interested in partitioning the complete application. Consequently, a set of components can be selected that do not greatly overlap (e.g., are not all sub-components of a component). In some implementations, for example, a user can partition an application into servlet components and web service components, and another application into XML parsing components, logging components and database access components.

For each component identified as a component of interest, an entry method 1002' is defined. An entry method is a method by which a component is assumed to be entered. More plainly, an entry method is the first called method for a particular component. By way of one non-limiting example, a servlet component can be entered by a doPost( ) method. In this example, the doPost( ) method is defined as an entry method. The definition of the entry methods defines the quality by which the components can be subsequently determined. In the example illustration of FIG. 10, Method 6 and Method 7 are defined as entry methods 1002'.

An entry method can be identified in one of several non-limiting manners. In some implementations, entry methods can be identified by reviewing the specification of well specified components (e.g., in the case of servlets, the standard specifies the methods by which a servlet is entered). In some implementations, entry methods can be identified as all of the methods of a class or package of interest. This can be done if the number of entry methods may be large or there is no clear specification (e.g., in the case of an XML parser, several methods can be considered as entry methods). In such instances, the entry methods can be specified using a filter. For example, the filter can indicate that all methods of classes that are in the javax.xml or one of its sub-packages are considered to be entry methods. Entry methods can also be identified by inspecting the source code of the application, and/or by inspecting the method tree of an allocation or method trace.

To provide a component call stack from a method call stack, the methods are examined in the order called. In the exemplar case of FIG. 10, the methods are examined from the bottom up. If the currently considered method is defined as an entry method, it is assumed that a corresponding component begins with that method. In this case, every method above the entry method in the method call stack is assigned to the particular component until a subsequent entry method is encountered. In the exemplar illustration of FIG. 10, Method 6 is the first encountered entry method, and Method 17 is the next encountered entry method. Consequently, Component X includes Method 6 through Method 16, and Component Y includes Method 17 and Method 18. In this exemplar case, Method 18 is the last called method in the application. Accordingly, a method called immediately prior to an entry method is implicitly provided as an exit method (i.e., the last called method of a particular component). Because none of Method 1 through Method 5 is defined as an entry method, these methods are assigned to the special component (i.e., Other). If, however, no method in the method call stack is identified as an entry method, the entire method call stack is assigned to the special component (i.e., Other).

The benefit of using only a set of entry methods to define a component is that only a limited number of methods is required. This is substantial, considering that the overall number of methods for an application can include hundreds, thousand or even millions of methods). By using only a set of entry methods, it is feasible to define a component. In accordance with some implementations, utility methods are automatically assigned to the component calling them. In some implementations, exit methods can be explicitly defined, each exit method being the last method to be called when a component ends. The granularity of the components can be changed by adding or deleting components that describe more specific uses. For example, in the case of an HTTP servlet component, one definition can include the 'doPost' and 'doGet' method calls. If, however, only the 'doPost' method is included in the definition, the component would only include servlets called by a POST HTTP request, and not by a GET HTTP request.

Referring now to FIGS. 11 and 12, the component call stack can be used to generate flat and/or hierarchical component statistics. FIG. 11 is an exemplar screen-shot 1100 illustrating a flat component statistic view, and FIG. 12 is an exemplar screen-shot 1200 illustrating a hierarchical component statistic view. To generate the component statistic views, the collected profiling data can be parsed on a component-by-component basis, wherein the profiling data of a particular component corresponds to the aggregate profiling data of the methods that make up that component. Because the component call stack is based on an original method call stack, it is always possible to go from the component call stack back to the method call stack to provide a method-by-method statistic view, such as that illustrated in FIG. 9.

Figure 13A:
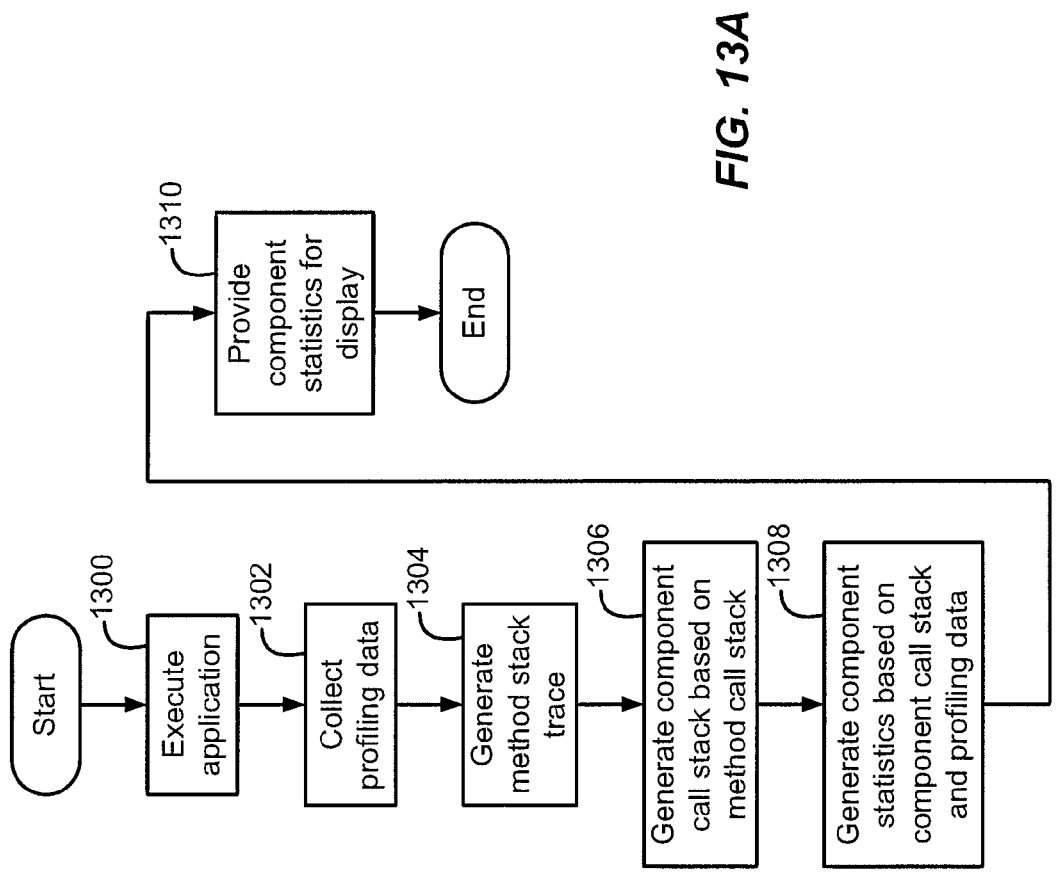
FIGS. 13A and 13B provide flowcharts illustrating exemplar steps that can be executed in accordance with implementations of the present disclosure.

Referring now to FIG. 13A, exemplar steps that can be executed in accordance with implementations of the present disclosure will be described. The exemplar steps of FIG. 13A can be executed using one or more processors coupled to a computer-readable storage medium at a computer system (e.g., the computer system 114 including server 102) and/or a client device (e.g., the client devices 108, 110). In step 1300, an application is executed. For example, the application can be run on the back-end VM 218 on the computer system 114. In step 1302, profiling data is collected. The profiling data can be collected using the profiler 212b running on the back-end VM 218, for example. A method call stack is generated in step 1304. The method call stack can be generated by the profiler 212b running on the back-end VM 218, for example.

In step 1306, the component call stack is generated based on the method call stack. Exemplar steps that can be implemented to perform this generation will be described with reference to FIG. 13B. In step 1308, component statistics are generated based on the component call stack and the profiling. More specifically, and as discussed above, the component statistics provide profiling data on a component-by-component basis. The profiling data of each component includes aggregates of the profiling data of the methods that make up the particular component. In step 1310, the component statistics are provided for display and the steps end. For example, the component statistics can be transmitted from the computer system 114 to a client device 108, 110 for display to a user. The component statistics can be transmitted in response to receiving a user input indicating a request for the component statistics.

Figure 13B:
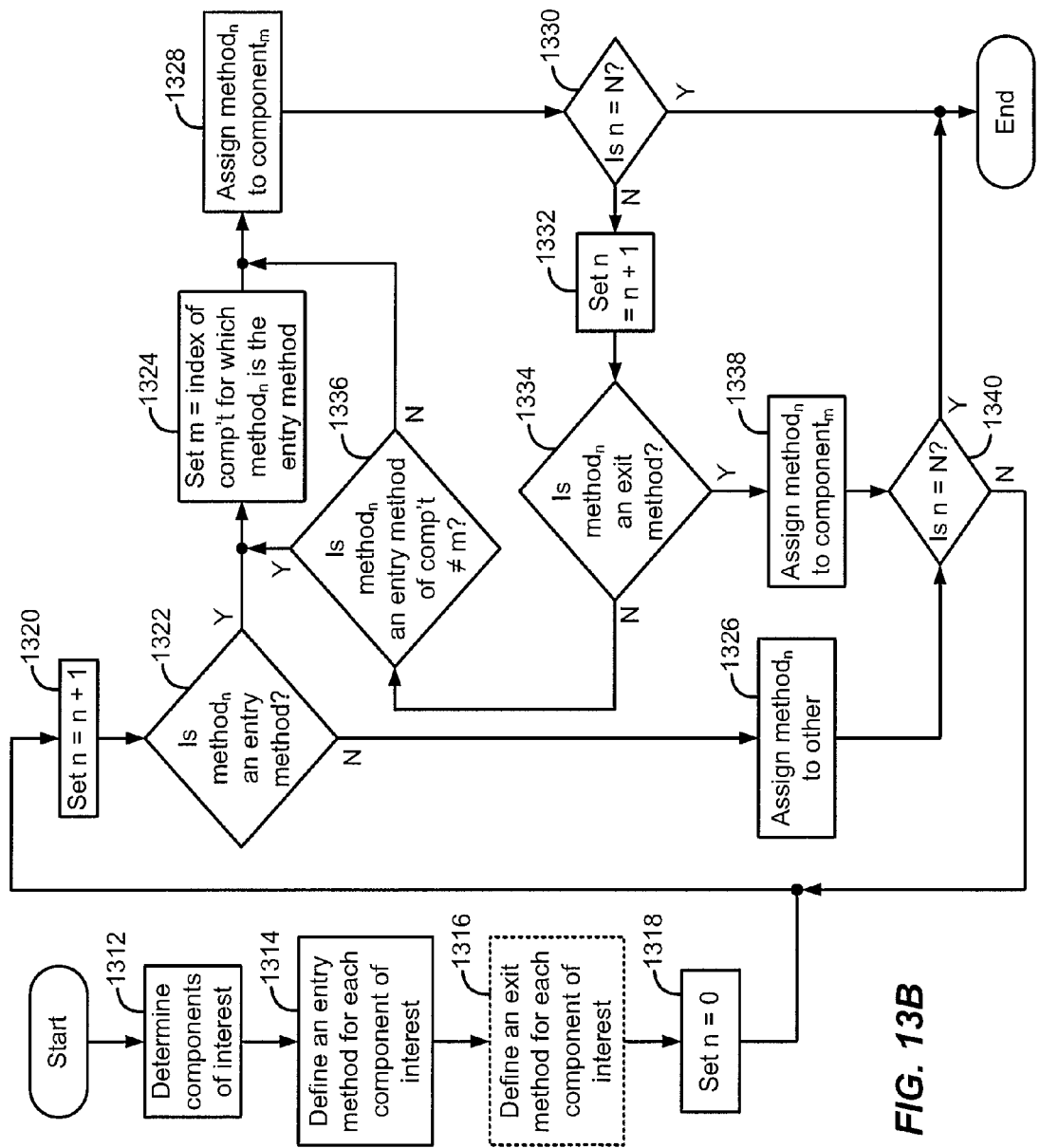

Referring now to FIG. 13B, exemplar steps that can be executed to generate a component call stack based on a method call stack will be described. It is contemplated that steps of FIG. 13B can be performed by the front-end (e.g., client device 108, 110). In some implementations, however, one or more steps of FIG. 13B can be performed by the back-end (e.g., computer system 114) for example, and can be based on user input provided to the computer system 114 from the client device 108, 110.

In step 1312, components of interest can be determined. More specifically, a particular component of interest can be identified based on a user input. For example, a user can provide user input to the client device 108, 110, which user input can be sent to the computer system 114. In this manner, the computer system 114 is made aware of one or more components that the user is interested in obtaining profiling data for. In step 1314, an entry method is defined for each component of interest. For example, a user can provide user input to the client device 108, 110, which user input can be sent to the computer system 114. In this manner, the computer system 114 is made aware of the entry method for each component of interest. Step 1316 can be provided as an alternative step. In step 1316, an exit method can be defined for each of component of interest. For example, a user can provide user input to the client device 108, 110, which user input can be sent to the computer system 114. In this manner, the computer system 114 is made aware of the exit method for each component of interest.

In step 1318, a counter n is set equal to zero (i.e., n=0). The counter n indicates a particular method in a method call stack that includes up to N methods. In step 1320, the counter n is incremented by one (i.e., n=n+1). In step 1322, it is determined whether a particular method, $method_n$, is an entry method. For example, if n is equal to one (i.e., n=1), it is determined whether the first method in the method call stack is an entry method in step 1322. As another example, if n is equal to five (i.e., n=5), it is determined whether the fifth method in the method call stack is an entry method in step 1322. If the $method_n$ is an entry method, the steps continue in step 1324. If the $method_n$ is not an entry method, the steps continue in step 1326.

In step 1324, m is set equal to the index of the component, for which $method_n$ is defined as the entry method. For example, and with reference to FIG. 10, if n is equal to six (i.e., n=6) $method_6$ would be identified as an entry method of Component X. Consequently, m would be set equal to X in step 1324. In step 1328, $method_n$ is assigned to $component_m$. In step 1330, it is determined whether n is equal to N. More specifically, it is determined whether n indicates the last method in the method call stack. If n is not equal to N, the steps continue in step 1332. If n is not equal to N, the steps end.

In step 1332, the counter n is incremented by one (i.e., n=n+1). In step 1334, it is determined whether $method_n$ is an exit method. If $method_n$ is not an exit method, the steps continue in step 1336. If $method_n$ is an exit method, the steps continue in step 1338. In step 1336, it is determined whether $method_n$ is an entry method of a component that is not the component of index m (e.g., not the currently considered component). If $method_n$ is an entry method of another component, the steps continue in step 1324. If $method_n$ is not an entry method of another component, the steps continue in step 1328.

In step 1326, $method_n$ is assigned to "other" and the steps continue in step 1340. In step 1338, $method_n$ is assigned to $component_m$ and the steps continue in step 1340. In step 1340, it is determined whether n is equal to N. More specifically, it is determined whether n indicates the last method in the method call stack. If n is not equal to N, the steps loop back to step 1320. If n is not equal to N, the steps end.

Figure 14:
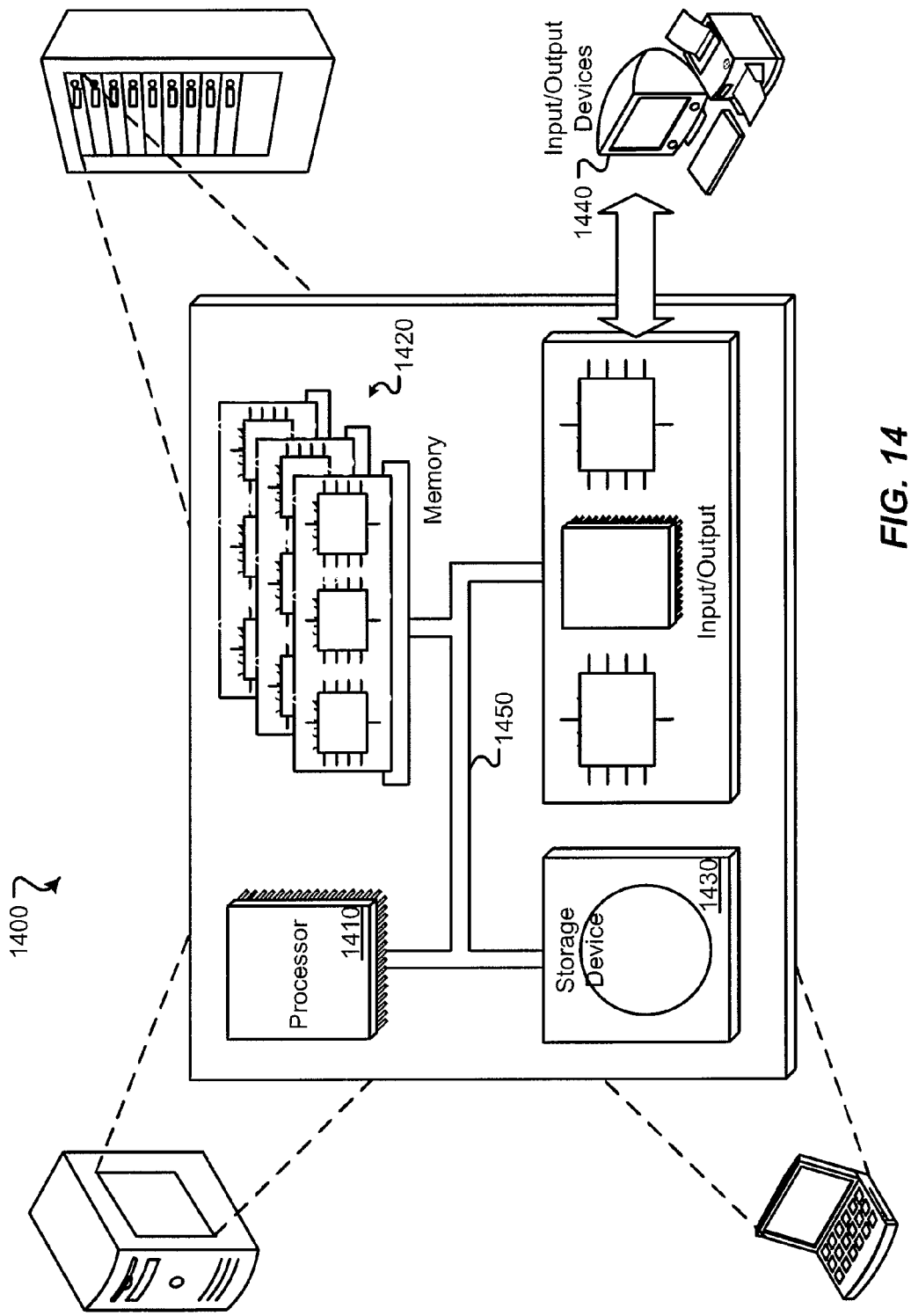
FIG. 14 is a schematic illustration of exemplar computer systems that can be used to execute implementations of the present disclosure.

Referring now to FIG. 14, a schematic illustration of exemplar hardware components 1400 that can be used to execute implementations of the present disclosure is provided. The system 1400 can be used for the operations described in association with the methods described in accordance with implementations of the present disclosure. For example, the system 1400 may be included in the application server 102. The system 1400 includes a processor 1410, a memory 1420, a storage device 1430, and an input/output device 1440. Each of the components 1410, 1420, 1430, and 1440 are interconnected using a system bus 1450. The processor 1410 is capable of processing instructions for execution within the system 1400. In one implementation, the processor 1410 is a single-threaded processor. In another implementation, the processor 1410 is a multi-threaded processor. The processor 1410 is capable of processing instructions stored in the memory 1420 or on the storage device 1430 to display graphical information for a user interface on the input/output device 1440.

The memory 1420 stores information within the system 1400. In one implementation, the memory 1420 is a computer-readable medium. In one implementation, the memory 1420 is a volatile memory unit. In another implementation, the memory 1420 is a non-volatile memory unit. The storage device 1430 is capable of providing mass storage for the system 1400. In one implementation, the storage device 1430 is a computer-readable medium. In various different implementations, the storage device 1430 may be a floppy disk device, a hard disk device, an optical disk device, or a tape device. The input/output device 1440 provides input/output operations for the system 1400. In one implementation, the input/output device 1440 includes a keyboard and/or pointing device. In another implementation, the input/output device 1440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method, comprising:
executing an application using one or more processors;
tracking every allocation in the application;
generating a plurality of method call stacks based on allocations in the application, each method call stack comprising a plurality of methods invoked by the application;
generating, from a method call stack of the plurality of method call stacks, a component call stack by examining methods of the method call stack in the order the methods were called, the component call stack comprising a plurality of components, each component comprising one or more methods of the plurality of methods of the method call stack, being associated with an application component of the application and being provided based on an entry method and an exit method, the entry method being a method through which the application component is assumed to be entered and the exit method being a method immediately preceding a next component in the component call stack; and
generating, for each component in the component call stack, component statistics based on profiling data collected for the plurality of methods during execution of the application, the component statistics providing information that is broader than the profiling data.

2. The computer-implemented method of claim 1, wherein generating component statistics comprises:
- providing profiling data corresponding to each method of the plurality of methods; and
- for each component, aggregating profiling data of the one or more methods that defines a particular component, a component statistic for a particular component comprising the aggregate profiling data of the one or more methods that define the particular component.

3. The computer-implemented method of claim 1, further comprising:
- defining an entry method for each component of the plurality of components to provide a plurality of defined entry methods; and
- grouping one or more methods based on the entry methods to provide one or more method groups, each method group corresponding to a component.

4. The computer-implemented method of claim 3, wherein grouping comprises:
- identifying a first method as an entry method;
- identifying a second method as an entry method; and
- grouping the first method and subsequent consecutive methods into a group, the subsequent consecutive methods being prior to the second method in the method call stack.

5. The computer-implemented method of claim 1, further comprising:
- defining the plurality of methods invoked by the application as methods to be traced;
- monitoring the plurality of methods during execution of the application; and
- collecting the profiling data, the profiling data corresponding to each method of the plurality of methods.

6. The computer-implemented method of claim 1, further comprising:
- receiving user input identifying one or more components of interest; and
- identifying one or more components to be included in the plurality of components of the component call stack based on the user input.

7. The computer-implemented method of claim 1, further comprising sending the component statistics for display on a client device.

8. A non-transitory computer-readable storage medium coupled to one or more processors and having instructions stored thereon which, when executed by the one or more processors, cause the one or more processors to perform operations comprising:
- executing an application using the one or more processors;
- tracking every allocation in the application;
- generating a plurality of method call stacks based on allocations in the application, each method call stack comprising a plurality of methods invoked by the application;
- generating, from a method call stack of the plurality of method call stacks, a component call stack by examining methods of the method call stack in the order the methods were called, the component call stack comprising a plurality of components, each component comprising one or more methods of the plurality of methods of the method call stack, being associated with an application component of the application and being provided based on an entry method and an exit method, the entry method being a method through which the application component is assumed to be entered and the exit method being a method immediately preceding a next component in the component call stack; and
- generating, for each component in the component call stack, component statistics based on profiling data collected during execution of the application, the component statistics providing information that is broader than the profiling data.

9. The non-transitory computer-readable storage medium of claim 8, wherein generating component statistics comprises:
- providing profiling data corresponding to each method of the plurality of methods; and
- for each component, aggregating profiling data of the one or more methods that defines a particular component, a component statistic for a particular component comprising the aggregate profiling data of the one or more methods that define the particular component.

10. The non-transitory computer-readable storage medium of claim 8, wherein the operations further comprise:
- defining an entry method for each component of the plurality of components to provide a plurality of defined entry methods; and
- grouping one or more methods based on the entry methods to provide one or more method groups, each method group corresponding to a component.

11. The non-transitory computer-readable storage medium of claim 10, wherein grouping comprises:
- identifying a first method as an entry method;
- identifying a second method as an entry method; and
- grouping the first method and subsequent consecutive methods into a group, the subsequent consecutive methods being prior to the second method in the method call stack.

12. The non-transitory computer-readable storage medium of claim 8, wherein the operations further comprise:
- defining the plurality of methods invoked by the application as methods to be traced;
- monitoring the plurality of methods during execution of the application; and
- collecting the profiling data, the profiling data corresponding to each method of the plurality of methods.

13. The non-transitory computer-readable storage medium of claim 8, wherein the operations further comprise:
- receiving user input identifying one or more components of interest; and
- identifying one or more components to be included in the plurality of components of the component call stack based on the user input.

14. The non-transitory computer-readable storage medium of claim 8, wherein the operations further comprise sending the component statistics for display on a client device.

15. A system, comprising:
- a computing device including a computer-readable storage medium coupled to one or more processors and having instructions stored thereon which, when executed by the one or more processors, cause the one or more processors to perform operations comprising:
- executing an application using the one or more processors;
- tracking every allocation in the application;
- generating a plurality of method call stacks based on allocations in the application, each method call stack comprising a plurality of methods invoked by the application;
- generating, from a method call stack of the plurality of method call stacks, a component call stack by examining methods of the method call stack in the order the methods were called, the component call stack comprising a plurality of components, each component comprising one or more methods of the plurality of methods of the method call stack, being associated with an application component of the application and being provided based on an entry method and an exit method, the entry method being a method through which the application component is assumed to be entered and the exit method being a method immediately preceding a next component in the component call stack; and generating, for each component in the component call stack, component statistics based on profiling data collected during execution of the application, the component statistics providing information that is broader than the profiling data.

16. The system of claim 15, wherein generating component statistics comprises:
providing profiling data corresponding to each method of the plurality of methods; and
for each component, aggregating profiling data of the one or more methods that defines a particular component, a component statistic for a particular component comprising the aggregate profiling data of the one or more methods that define the particular component.

17. The system of claim 15, wherein the operations further comprise:
defining an entry method for each component of the plurality of components to provide a plurality of defined entry methods; and
grouping one or more methods based on the entry methods to provide one or more method groups, each method group corresponding to a component.

18. The system of claim 17, wherein grouping comprises:
identifying a first method as an entry method;
identifying a second method as an entry method; and
grouping the first method and subsequent consecutive methods into a group, the subsequent consecutive methods being prior to the second method in the method call stack.

19. The system of claim 15, wherein the operations further comprise:
defining the plurality of methods invoked by the application as methods to be traced;
monitoring the plurality of methods during execution of the application; and
collecting the profiling data, the profiling data corresponding to each method of the plurality of methods.

20. The system of claim 15, wherein the operations further comprise:
receiving user input identifying one or more components of interest; and
identifying one or more components to be included in the plurality of components of the component call stack based on the user input.

21. The system of claim 15, wherein the operations further comprise sending the component statistics for display on a client device that is in communication with the computing device.

* * * * *